(12) United States Patent
Lopata et al.

(10) Patent No.: US 9,246,390 B2
(45) Date of Patent: Jan. 26, 2016

(54) POWER CONVERTER WITH CONTROLLER OPERABLE IN SELECTED MODES OF OPERATION

(75) Inventors: Douglas Dean Lopata, Boyertown, PA (US); Ashraf W. Lotfi, Bridgewater, NJ (US)

(73) Assignee: Enpirion, Inc., Hampton, NJ (US)

( * ) Notice: Subject to any disclaimer, the term of this patent is extended or adjusted under 35 U.S.C. 154(b) by 435 days.

(21) Appl. No.: 12/939,498

(22) Filed: Nov. 4, 2010

(65) Prior Publication Data

US 2011/0101949 A1    May 5, 2011

Related U.S. Application Data

(63) Continuation-in-part of application No. 12/707,420, filed on Feb. 17, 2010, now Pat. No. 8,154,261, which is a continuation of application No. 12/103,993, filed on Apr. 16, 2008, now Pat. No. 7,679,342.

(51) Int. Cl.
*G05F 1/00* (2006.01)
*H02M 3/158* (2006.01)
*H02M 3/156* (2006.01)
*H02M 1/00* (2007.01)

(52) U.S. Cl.
CPC ............ *H02M 3/1588* (2013.01); *H02M 3/156* (2013.01); *H02M 2001/0032* (2013.01); *Y02B 70/1466* (2013.01); *Y02B 70/16* (2013.01)

(58) Field of Classification Search
CPC ...... H02M 3/155; H02M 3/156; H02M 3/157; H02M 3/158; H02M 2003/1555; H02M 2003/1566
USPC ........... 323/224, 234, 273–275, 282–285, 237
See application file for complete search history.

(56) References Cited

U.S. PATENT DOCUMENTS

| 1,889,398 A | 11/1932 | Bishop |
| 2,600,473 A | 6/1952 | Brockman |
| 3,210,707 A | 10/1965 | Constantakes |
| 3,691,497 A | 9/1972 | Bailey et al. |
| 3,762,039 A | 10/1973 | Douglass et al. |

(Continued)

FOREIGN PATENT DOCUMENTS

| GB | 2041818 A | 9/1980 |
| JP | 1072517 | 3/1989 |

(Continued)

OTHER PUBLICATIONS

Barrado, A., et al., "New DC/DC Converter with Low Output Voltage and Fast Transient Response," Proceedings of the IEEE Applied Power Electronics Conference, 2003, pp. 432-437, IEEE, Los Alamitos, CA.

(Continued)

*Primary Examiner* — Jeffrey Gblende
(74) *Attorney, Agent, or Firm* — Boisbrun Hofman, PLLC

(57) ABSTRACT

A power converter and method of controlling the same for selected modes of operation. In one embodiment, the power converter includes a first power switch coupled to a source of electrical power and a second power switch coupled to the first power switch and to an output terminal of the power converter. The power converter also includes a controller configured to control an operation of the first and second power switches during selected modes of operation.

18 Claims, 17 Drawing Sheets

(56) References Cited

U.S. PATENT DOCUMENTS

| | | |
|---|---|---|
| 3,902,148 A | 8/1975 | Drees et al. |
| 3,908,264 A | 9/1975 | Friberg et al. |
| 3,947,699 A | 3/1976 | Whitmer |
| 4,016,461 A | 4/1977 | Roland |
| 4,101,389 A | 7/1978 | Uedaira |
| 4,103,267 A | 7/1978 | Olschewski |
| 4,187,128 A | 2/1980 | Billings et al. |
| 4,199,743 A | 4/1980 | Martincic |
| 4,433,927 A | 2/1984 | Cavallari |
| 4,586,436 A | 5/1986 | Denney et al. |
| 4,636,752 A | 1/1987 | Saito |
| 4,654,770 A | 3/1987 | Santurtûn et al. |
| 4,668,310 A | 5/1987 | Kudo et al. |
| 4,681,718 A | 7/1987 | Oldham |
| 4,751,199 A | 6/1988 | Phy |
| 4,754,317 A | 6/1988 | Comstock et al. |
| 4,761,725 A | 8/1988 | Henze |
| 4,777,465 A | 10/1988 | Meinel |
| 4,801,816 A | 1/1989 | Merlo et al. |
| 4,808,118 A | 2/1989 | Wilson et al. |
| 4,847,986 A | 7/1989 | Meinel |
| 4,870,224 A | 9/1989 | Smith et al. |
| 4,912,622 A | 3/1990 | Steigerwald et al. |
| 4,916,522 A | 4/1990 | Cohn |
| 4,975,671 A | 12/1990 | Dirks |
| 4,982,353 A | 1/1991 | Jacob et al. |
| 5,056,214 A | 10/1991 | Holt |
| 5,059,278 A | 10/1991 | Cohen et al. |
| 5,096,513 A | 3/1992 | Sawa et al. |
| 5,118,298 A | 6/1992 | Murphy |
| 5,161,098 A | 11/1992 | Balakrishnan |
| 5,187,119 A | 2/1993 | Cech et al. |
| 5,245,228 A | 9/1993 | Harter |
| 5,258,662 A | 11/1993 | Skovmand |
| 5,262,296 A | 11/1993 | Ogawa et al. |
| 5,279,988 A | 1/1994 | Saadat et al. |
| 5,285,369 A | 2/1994 | Balakrishnan |
| 5,345,670 A | 9/1994 | Pitzele |
| 5,353,001 A | 10/1994 | Meinel et al. |
| 5,371,415 A | 12/1994 | Dixon et al. |
| 5,414,341 A | 5/1995 | Brown |
| 5,428,245 A | 6/1995 | Lin et al. |
| 5,436,409 A | 7/1995 | Sawada et al. |
| 5,457,624 A | 10/1995 | Hastings |
| 5,469,334 A | 11/1995 | Balakrishnan |
| 5,481,219 A | 1/1996 | Jacobs et al. |
| 5,484,494 A | 1/1996 | Oda et al. |
| 5,510,739 A | 4/1996 | Caravella et al. |
| 5,524,334 A | 6/1996 | Boesel |
| 5,541,541 A | 7/1996 | Salamina et al. |
| 5,548,206 A | 8/1996 | Soo |
| 5,561,438 A | 10/1996 | Nakazawa et al. |
| 5,568,044 A | 10/1996 | Bittner |
| 5,574,273 A | 11/1996 | Nakazawa et al. |
| 5,574,420 A | 11/1996 | Roy et al. |
| 5,578,261 A | 11/1996 | Manzione et al. |
| 5,592,072 A | 1/1997 | Brown |
| 5,594,324 A | 1/1997 | Canter et al. |
| 5,625,312 A | 4/1997 | Kawakami et al. |
| 5,689,213 A | 11/1997 | Sher |
| 5,692,296 A | 12/1997 | Variot |
| 5,783,025 A | 7/1998 | Hwang et al. |
| 5,787,569 A | 8/1998 | Lotfi et al. |
| 5,788,854 A | 8/1998 | Desaigoudar et al. |
| 5,796,276 A | 8/1998 | Phillips et al. |
| 5,802,702 A | 9/1998 | Fleming et al. |
| 5,807,959 A | 9/1998 | Wu et al. |
| 5,834,691 A | 11/1998 | Aoki |
| 5,835,350 A | 11/1998 | Stevens |
| 5,837,155 A | 11/1998 | Inagaki et al. |
| 5,846,441 A | 12/1998 | Roh |
| 5,864,225 A | 1/1999 | Bryson |
| 5,877,611 A | 3/1999 | Brkovic |
| 5,898,991 A | 5/1999 | Fogel et al. |
| 5,912,589 A | 6/1999 | Khoury et al. |
| 5,920,249 A | 7/1999 | Huss |
| 5,973,923 A | 10/1999 | Jitaru |
| 5,977,811 A | 11/1999 | Magazzu |
| 5,998,925 A | 12/1999 | Shimizu |
| 6,005,377 A | 12/1999 | Chen et al. |
| 6,060,176 A | 5/2000 | Semkow et al. |
| 6,081,997 A | 7/2000 | Chia et al. |
| 6,094,123 A | 7/2000 | Roy |
| 6,101,218 A | 8/2000 | Nagano |
| 6,118,351 A | 9/2000 | Kossives et al. |
| 6,118,360 A | 9/2000 | Neff |
| 6,160,721 A | 12/2000 | Kossives et al. |
| 6,169,433 B1 | 1/2001 | Farrenkopf |
| 6,201,429 B1 | 3/2001 | Rosenthal |
| 6,211,706 B1 | 4/2001 | Choi et al. |
| 6,222,403 B1 | 4/2001 | Mitsuda |
| 6,239,509 B1 | 5/2001 | Rader, III et al. |
| 6,255,714 B1 | 7/2001 | Kossives et al. |
| 6,262,564 B1 | 7/2001 | Kanamori |
| 6,285,209 B1 | 9/2001 | Sawai |
| 6,285,539 B1 | 9/2001 | Kashimoto et al. |
| 6,288,920 B1 | 9/2001 | Jacobs et al. |
| 6,317,948 B1 | 11/2001 | Kola et al. |
| 6,320,449 B1 | 11/2001 | Capici et al. |
| 6,353,379 B1 | 3/2002 | Busletta |
| 6,366,486 B1 | 4/2002 | Chen et al. |
| 6,388,468 B1 | 5/2002 | Li |
| 6,407,579 B1 | 6/2002 | Goswick |
| 6,407,594 B1 | 6/2002 | Milazzo et al. |
| 6,440,750 B1 | 8/2002 | Feygenson et al. |
| 6,452,368 B1 | 9/2002 | Basso et al. |
| 6,466,454 B1 | 10/2002 | Jitaru |
| 6,477,065 B2 | 11/2002 | Parks |
| 6,479,981 B2 | 11/2002 | Schweitzer, Jr. et al. |
| 6,495,019 B1 | 12/2002 | Filas et al. |
| 6,541,819 B2 | 4/2003 | Lotfi et al. |
| 6,549,409 B1 | 4/2003 | Saxelby, Jr. et al. |
| 6,552,629 B2 | 4/2003 | Dixon et al. |
| 6,570,413 B1 | 5/2003 | Kumagai et al. |
| 6,573,694 B2 | 6/2003 | Pulkin et al. |
| 6,578,253 B1 | 6/2003 | Herbert |
| 6,580,258 B2 | 6/2003 | Wilcox et al. |
| 6,608,332 B2 | 8/2003 | Shimizu et al. |
| 6,621,256 B2 | 9/2003 | Muratov et al. |
| 6,624,498 B2 | 9/2003 | Filas et al. |
| 6,639,427 B2 | 10/2003 | Dray et al. |
| 6,649,422 B2 | 11/2003 | Kossives et al. |
| 6,650,169 B2 | 11/2003 | Faye et al. |
| 6,661,216 B1 | 12/2003 | Grant et al. |
| 6,691,398 B2 | 2/2004 | Gutierrez |
| 6,693,805 B1 | 2/2004 | Steigerwald et al. |
| 6,731,002 B2 | 5/2004 | Choi |
| 6,747,538 B2 | 6/2004 | Kuwata et al. |
| 6,759,836 B1 | 7/2004 | Black, Jr. |
| 6,790,379 B2 | 9/2004 | Aoki et al. |
| 6,791,305 B2 | 9/2004 | Imai et al. |
| 6,806,807 B2 | 10/2004 | Cayne et al. |
| 6,808,807 B2 | 10/2004 | Anand et al. |
| 6,815,936 B2 * | 11/2004 | Wiktor et al. ............... 323/282 |
| 6,822,882 B1 | 11/2004 | Jacobs et al. |
| 6,828,825 B2 | 12/2004 | Johnson et al. |
| 6,856,007 B2 | 2/2005 | Warner |
| 6,879,137 B2 | 4/2005 | Sase et al. |
| 6,912,781 B2 | 7/2005 | Morrison et al. |
| 6,922,041 B2 | 7/2005 | Goder et al. |
| 6,922,044 B2 | 7/2005 | Walters et al. |
| 6,922,130 B2 | 7/2005 | Okamoto |
| 6,984,968 B2 | 1/2006 | Moon |
| 6,989,121 B2 | 1/2006 | Thummel |
| 6,998,952 B2 | 2/2006 | Zhou et al. |
| 7,015,544 B2 | 3/2006 | Lotfi et al. |
| 7,019,505 B2 | 3/2006 | Dwarakanath et al. |
| 7,020,295 B2 | 3/2006 | Hamada et al. |
| 7,021,518 B2 | 4/2006 | Kossives et al. |
| 7,023,315 B2 | 4/2006 | Yeo et al. |
| 7,038,438 B2 | 5/2006 | Dwarakanath et al. |
| 7,038,514 B2 | 5/2006 | Leith et al. |
| 7,057,486 B2 | 6/2006 | Kiko |
| 7,061,217 B2 | 6/2006 | Bayer et al. |

(56) References Cited

U.S. PATENT DOCUMENTS

| | | |
|---|---|---|
| 7,101,737 B2 | 9/2006 | Cobbley |
| 7,102,419 B2 | 9/2006 | Lou et al. |
| 7,109,688 B1 | 9/2006 | Chiu et al. |
| 7,148,670 B2 | 12/2006 | Inn et al. |
| 7,157,888 B2 | 1/2007 | Chen et al. |
| 7,175,718 B2 | 2/2007 | Nobutoki et al. |
| 7,180,395 B2 | 2/2007 | Lotfi et al. |
| 7,190,150 B2 | 3/2007 | Chen et al. |
| 7,214,985 B2 | 5/2007 | Lotfi et al. |
| 7,229,886 B2 | 6/2007 | Lotfi et al. |
| 7,230,302 B2 | 6/2007 | Lotfi et al. |
| 7,230,316 B2 | 6/2007 | Yamazaki et al. |
| 7,232,733 B2 | 6/2007 | Lotfi et al. |
| 7,235,955 B2 | 6/2007 | Solie et al. |
| 7,236,086 B1 | 6/2007 | Vinciarelli et al. |
| 7,244,994 B2 | 7/2007 | Lotfi et al. |
| 7,250,842 B1 | 7/2007 | Johnson et al. |
| 7,256,674 B2 | 8/2007 | Lotfi et al. |
| 7,276,998 B2 | 10/2007 | Lotfi et al. |
| 7,297,631 B2 | 11/2007 | Nair et al. |
| 7,319,311 B2 | 1/2008 | Nishida |
| 7,330,017 B2 | 2/2008 | Dwarakanath et al. |
| 7,348,829 B2 | 3/2008 | Choy et al. |
| 7,352,162 B1 | 4/2008 | Chang et al. |
| 7,368,897 B2 | 5/2008 | Qahouq et al. |
| 7,414,507 B2 | 8/2008 | Giandalia et al. |
| 7,423,508 B2 | 9/2008 | Gardner et al. |
| 7,426,780 B2 | 9/2008 | Lotfi et al. |
| 7,482,795 B2 | 1/2009 | Parto et al. |
| 7,482,796 B2 | 1/2009 | Nishida |
| 7,501,805 B2 | 3/2009 | Chen et al. |
| 7,521,907 B2 | 4/2009 | Cervera et al. |
| 7,522,432 B2 | 4/2009 | Shimizu |
| 7,544,995 B2 | 6/2009 | Lotfi et al. |
| 7,598,606 B2 | 10/2009 | Chow et al. |
| 7,602,167 B2 | 10/2009 | Trafton et al. |
| 7,612,603 B1 | 11/2009 | Petricek et al. |
| 7,635,910 B2 | 12/2009 | Sinaga et al. |
| 7,642,762 B2 | 1/2010 | Xie et al. |
| 7,676,402 B2 | 3/2010 | Moody |
| 7,679,341 B2 | 3/2010 | Chen |
| 7,679,342 B2 | 3/2010 | Lopata et al. |
| 7,688,172 B2 | 3/2010 | Lotfi et al. |
| 7,710,093 B2 | 5/2010 | Dwarakanath et al. |
| 7,714,558 B2 | 5/2010 | Wu |
| 7,728,573 B2 | 6/2010 | Capilla et al. |
| 7,733,072 B2 | 6/2010 | Kanakubo |
| 7,746,041 B2 | 6/2010 | Xu et al. |
| 7,746,042 B2 | 6/2010 | Williams et al. |
| 7,790,500 B2 | 9/2010 | Ramos et al. |
| 7,791,324 B2 | 9/2010 | Mehas et al. |
| 7,791,440 B2 | 9/2010 | Ramadan et al. |
| 7,838,395 B2 | 11/2010 | Badakere et al. |
| 7,859,233 B1 | 12/2010 | Silva et al. |
| 7,876,080 B2 | 1/2011 | Dwarakanath et al. |
| 7,876,572 B2 | 1/2011 | Sota et al. |
| 7,888,926 B2 | 2/2011 | Ishino |
| 7,893,676 B2 | 2/2011 | Hanna |
| 7,911,294 B2 | 3/2011 | Harada et al. |
| 7,914,808 B2 | 3/2011 | Malaviya et al. |
| 7,936,160 B1 | 5/2011 | Sheehan |
| 7,948,280 B2 | 5/2011 | Dwarakanath et al. |
| 7,948,772 B2 | 5/2011 | Tung et al. |
| 7,974,103 B2 | 7/2011 | Lim et al. |
| 8,013,580 B2 | 9/2011 | Cervera et al. |
| 8,018,315 B2 | 9/2011 | Lotfi et al. |
| 8,085,106 B2 | 12/2011 | Huda et al. |
| 8,109,587 B2 | 2/2012 | Ishizaki |
| 8,154,261 B2 | 4/2012 | Lopata et al. |
| 8,283,901 B2 | 10/2012 | Lopata et al. |
| 8,410,769 B2 | 4/2013 | Lopata et al. |
| 8,541,881 B2 | 9/2013 | Lopata et al. |
| 8,686,698 B2 | 4/2014 | Lopata et al. |
| 8,692,532 B2 | 4/2014 | Lopata et al. |
| 8,698,463 B2 | 4/2014 | Dwarakanath et al. |
| 2001/0030595 A1 | 10/2001 | Hamatani et al. |
| 2001/0033015 A1 | 10/2001 | Corisis |
| 2001/0041384 A1 | 11/2001 | Ohgiyama et al. |
| 2002/0008566 A1 | 1/2002 | Taito et al. |
| 2002/0024873 A1 | 2/2002 | Tomishima et al. |
| 2002/0031032 A1 | 3/2002 | Ooishi |
| 2002/0076851 A1 | 6/2002 | Eden et al. |
| 2002/0135338 A1* | 9/2002 | Hobrecht et al. .............. 323/272 |
| 2002/0153258 A1 | 10/2002 | Filas et al. |
| 2002/0175661 A1 | 11/2002 | Wheeler et al. |
| 2003/0062541 A1 | 4/2003 | Warner |
| 2003/0076662 A1 | 4/2003 | Miehling |
| 2003/0189869 A1 | 10/2003 | Yamagata et al. |
| 2003/0232196 A1 | 12/2003 | Anand et al. |
| 2004/0125621 A1* | 7/2004 | Yang et al. ................ 363/21.14 |
| 2004/0130428 A1 | 7/2004 | Mignano et al. |
| 2004/0150500 A1 | 8/2004 | Kiko |
| 2004/0169498 A1 | 9/2004 | Goder et al. |
| 2004/0246077 A1 | 12/2004 | Misu et al. |
| 2005/0011672 A1 | 1/2005 | Alawani et al. |
| 2005/0035747 A1 | 2/2005 | Mullett |
| 2005/0046405 A1 | 3/2005 | Trafton et al. |
| 2005/0088216 A1 | 4/2005 | Arndt et al. |
| 2005/0167756 A1 | 8/2005 | Lotfi et al. |
| 2005/0168203 A1 | 8/2005 | Dwarakanath et al. |
| 2005/0168205 A1 | 8/2005 | Dwarakanath et al. |
| 2005/0169024 A1 | 8/2005 | Dwarakanath et al. |
| 2005/0212132 A1 | 9/2005 | Hsuan et al. |
| 2006/0017421 A1 | 1/2006 | Solie et al. |
| 2006/0038225 A1 | 2/2006 | Lotfi et al. |
| 2006/0096087 A1 | 5/2006 | Lotfi et al. |
| 2006/0096088 A1 | 5/2006 | Lotfi et al. |
| 2006/0097831 A1 | 5/2006 | Lotfi et al. |
| 2006/0097832 A1 | 5/2006 | Lotfi et al. |
| 2006/0097833 A1 | 5/2006 | Lotfi et al. |
| 2006/0109072 A1 | 5/2006 | Giandalia et al. |
| 2006/0132217 A1 | 6/2006 | Lou et al. |
| 2006/0145800 A1 | 7/2006 | Dadafshar et al. |
| 2006/0197207 A1 | 9/2006 | Chow et al. |
| 2006/0197583 A1 | 9/2006 | Yen et al. |
| 2006/0294437 A1 | 12/2006 | Washburn et al. |
| 2007/0023892 A1 | 2/2007 | Gauche et al. |
| 2007/0025092 A1 | 2/2007 | Lee et al. |
| 2007/0074386 A1 | 4/2007 | Lotfi et al. |
| 2007/0075815 A1 | 4/2007 | Lotfi et al. |
| 2007/0075816 A1 | 4/2007 | Lotfi et al. |
| 2007/0075817 A1 | 4/2007 | Lotfi et al. |
| 2007/0109700 A1 | 5/2007 | Shimogawa et al. |
| 2007/0164721 A1 | 7/2007 | Han |
| 2007/0210777 A1 | 9/2007 | Cervera et al. |
| 2007/0246808 A1 | 10/2007 | Ewe |
| 2007/0296383 A1 | 12/2007 | Xu et al. |
| 2008/0010075 A1 | 1/2008 | Moody |
| 2008/0018366 A1 | 1/2008 | Hanna |
| 2008/0055944 A1* | 3/2008 | Wang et al. ................ 363/21.06 |
| 2008/0079405 A1 | 4/2008 | Shimizu |
| 2008/0090079 A1 | 4/2008 | Fajardo et al. |
| 2008/0094114 A1 | 4/2008 | Dwarakanath et al. |
| 2008/0106246 A1 | 5/2008 | Dwarakanath et al. |
| 2008/0180075 A1 | 7/2008 | Xie et al. |
| 2008/0258274 A1 | 10/2008 | Sinaga et al. |
| 2008/0258278 A1 | 10/2008 | Ramos et al. |
| 2008/0297122 A1* | 12/2008 | Zhou et al. .................... 323/222 |
| 2008/0301929 A1 | 12/2008 | Lotfi et al. |
| 2009/0004774 A1 | 1/2009 | Lee et al. |
| 2009/0057822 A1 | 3/2009 | Wen et al. |
| 2009/0065964 A1 | 3/2009 | Lotfi et al. |
| 2009/0066300 A1 | 3/2009 | Lotfi et al. |
| 2009/0066467 A1 | 3/2009 | Lotfi et al. |
| 2009/0066468 A1 | 3/2009 | Lotfi et al. |
| 2009/0068347 A1 | 3/2009 | Lotfi et al. |
| 2009/0068400 A1 | 3/2009 | Lotfi et al. |
| 2009/0068761 A1 | 3/2009 | Lotfi et al. |
| 2009/0146297 A1 | 6/2009 | Badakere et al. |
| 2009/0167267 A1 | 7/2009 | Dwarakanath et al. |
| 2009/0212751 A1 | 8/2009 | Cervera et al. |
| 2009/0224823 A1 | 9/2009 | Gyohten et al. |
| 2009/0261791 A1 | 10/2009 | Lopata et al. |
| 2009/0295503 A1 | 12/2009 | Harada et al. |

(56) References Cited

U.S. PATENT DOCUMENTS

| | | |
|---|---|---|
| 2010/0072816 A1 | 3/2010 | Kenkare et al. |
| 2010/0084750 A1 | 4/2010 | Lotfi et al. |
| 2010/0087036 A1 | 4/2010 | Lotfi et al. |
| 2010/0110794 A1 | 5/2010 | Kim et al. |
| 2010/0164449 A1 | 7/2010 | Dwarakanath et al. |
| 2010/0164650 A1 | 7/2010 | Abou-Alfotouh et al. |
| 2010/0212150 A1 | 8/2010 | Lotfi et al. |
| 2010/0214746 A1 | 8/2010 | Lotfi et al. |
| 2011/0095742 A1 | 4/2011 | Lopata et al. |
| 2011/0101933 A1 | 5/2011 | Lopata et al. |
| 2011/0101934 A1 | 5/2011 | Lopata et al. |
| 2011/0101948 A1 | 5/2011 | Lopata et al. |
| 2011/0101949 A1 | 5/2011 | Lopata et al. |
| 2011/0181383 A1 | 7/2011 | Lotfi et al. |
| 2011/0316501 A1 | 12/2011 | Cervera et al. |
| 2012/0153912 A1 | 6/2012 | Demski et al. |
| 2012/0154013 A1 | 6/2012 | Mera et al. |

FOREIGN PATENT DOCUMENTS

| | | |
|---|---|---|
| JP | 2-228013 A | 9/1990 |
| JP | 5-314885 | 11/1993 |
| JP | 6251958 | 9/1994 |

OTHER PUBLICATIONS

Betancourt-Zamora, R.J. et al., "A 1.5 mW, 200 MHz CMOS VCO for Wireless Biotelemetry," First International Workshop on Design of Mixed-Mode Integrated Circuits and Applications, Jul. 1997, pp. 72-74, Cancun, Mexico.

Goder, D., et al., "V2 Architecture Provides Ultra-Fast Transient Response in Switch Mode Power Supplies," Proceedings of HFPC Power Conversion, 1996, pp. 414-420.

Goodman, J. et al., "An Energy/Security Scalable Encryption Processor Using an Embedded Variable Voltage DC/DC Converter," IEEE Journal of Solid-State Circuits, Nov. 1998, vol. 33, No. 11, IEEE, Los Alamitos, CA.

Horowitz, P., et al., "The Art of Electronics," Second Edition, 1989, pp. 288-291, Cambridge University Press, Cambridge, MA.

"Linear Technology: LTC3736-1: Dual 2-Phase, No RSENSETM, Synchronous Controller with Spread Spectrum," 2004, 28 pp., Linear Technology Corporation, Milpitas, CA.

Lotfi, A.W., et al., "Issues and Advances in High-Frequency Magnetics for Switching Power Supplies," Proceedings of the IEEE, Jun. 2001, vol. 89, No. 6, pp. 833-845, IEEE, Los Alamitos, CA.

Patella, B.J., et al., "High-Frequency Digital Controller IC for DC/DC Converters," IEEE Proceedings of the Applied Power Electronics Conference, Mar. 10, 2002, 7 pp., IEEE, Los Alamitos, CA.

Peterchev, A.V., et al., "Quantization Resolution and Limit Cycling in Digitally Controlled PWM Converters," IEEE Transactions on Power Electronics, Jan. 2003, pp. 301-303, vol. 18, No. 1, IEEE, Los Alamitos, CA.

Redl, R., et al., "Optimizing the Load Transient Response of the Buck Converter," Proceedings of the IEEE Applied Power Electronics Conference, 1998, pp. 170-176, IEEE, Los Alamitos, CA.

Schoneman, G.K., et al., "Output Impedance Considerations for Switching Regulators with Current-Injected Control," Proceedings of the 18th Annual IEEE Power Electronics Specialists Conference, Jun. 1987, pp. 324-335, IEEE, Los Alamitos, CA.

Soto, A., et al. "Analysis of the Buck Converter for Scaling the Supply Voltage of Digital Circuits," Proceedings of the IEEE Applied Power Electronics Conference, 2003, pp. 711-717, IEEE, Los Alamitos, CA.

Soto, A., et al., "Design Methodology for Dynamic Voltage Scaling in the Buck Converter," Proceedings of the IEEE Applied Power Electronics Conference, 2005, pp. 263-269, IEEE, Los Alamitos, CA.

"TPS40100: Midrange Input Synchronous Buck Controller with Advanced Sequencing and Output Margining," May 2005, 37 pp., Texas Instruments Incorporated, Dallas, TX.

Zhou, X., et al., "Improved Light-Load Efficiency for Synchronous Rectifier Voltage Regulation Module," IEEE Transactions on Power Electronics, Sep. 2000, pp. 826-834, vol. 15, No. 5, IEEE, Los Alamitos, CA.

Auir, "Automotive Grade AUIRS2016S (TR) High Side Driver with Internal Vs Recharge," International Rectifier, Datasheet, Jan. 26, 2009, 23 pages.

Chhawchharia, P. et al., "On the Reduction of Component Count in Switched Capacitor DC/DC Converters," IEEE, Jun. 1997, pp. 1395-1401.

Ericsson, "Technical Specification: PMF 8000 Series: POL Regulator, Input 10.8-13.2 V, Output 10 A/55 W," EN/LZT 146 318 R1C, Sep. 2006, pp. 1-47, Ericsson Power Modules AB, Stockholm, Sweden.

Feng, P. et al., "Chapter 1: History of the High-Voltage Charge Pump," Charge Pump Circuit Design, McGraw-Hill Electronic Engineering, Jul. 17, 2006, pp. 1-10.

Han, J., "A New Approach to Reducing Output Ripple in Switched-Capacitor-Based Step-Down DC-DC Converters," IEEE Transactions on Power Electronics, vol. 21, No. 6, Nov. 2006, pp. 1548-1555.

Holtek, "Holtek: HT7660: CMOS Switched-Capacitor Voltage Converter," Nov. 30, 1999, Holtek Semiconductor, Inc., Hsinchu, Taiwan, R.O.C., 9 pages.

IEEE, 2000, IEEE Standards 100-2000, 10.1109/IEEESTD.2000. 322223, pp. 1162-1163.

LTC Corp., "Linear Technology: LT1054: Switched-Capacitor Voltage Converter with Regulator," 1987, Linear Technology Corporation, Milpitas, CA, 16 pages.

LTC Corp., "Linear Technology: LTC1144: Switched-Capacitor Wide Input Range Voltage Converter with Shutdown," 1994, Linear Technology Corporation, Milpitas, CA, 8 pages.

Ma, M., "Design of High Efficiency Step-Down Switched Capacitor DC-DC Converter," Thesis submitted to Oregon State University, May 21, 2003, pp. 1-65.

Maxim, "Maxim: MAX828/MAX829 Switched-Capacitor Voltage Inverters," 19/0495; Rev 3; 9/99, Maxim Integrated Products, Sunnyvale, CA, 8 pages.

Merriam-Webster Online Dictionary, http://www.merriam-webster.com/dictionary/dynamically.

NS, "National Semiconductor: LM2665: Switched Capacitor Voltage Converter," Sep. 2005, National Semiconductor, Santa Clara, CA, 9 pages.

Sato, M. et al., "Influences of Molding Conditions on Die-pad Behavior in IC Encapsulation Process Analyzed by Hall Element Method," IEEE Transactions on Advanced Packaging, Aug. 2000, pp. 574-581, vol. 23, No. 3, IEEE, Los Alamitos, CA.

Ludikhuize, A.W., "A Review of RESURF Technology," Proceedings of IEEE ISPSD 2000, May 22, 2000, pp. 11-18.

Crecraft and Gergely, Analog Electronics, Butterworth-Heinemann, First Published 2002, p. 242.

\* cited by examiner

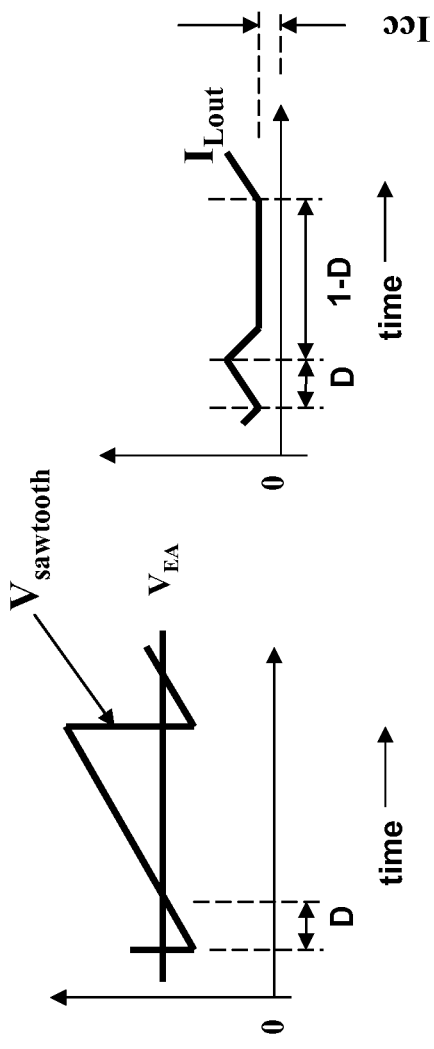
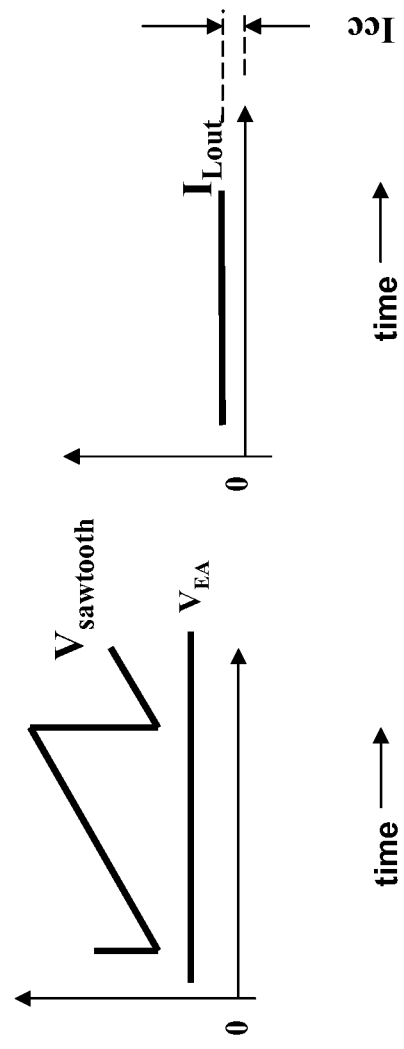
FIGURE 5C
FIGURE 5D

POWER CONVERTER WITH CONTROLLER OPERABLE IN SELECTED MODES OF OPERATION

This application is a continuation-in-part of patent application Ser. No. 12/707,420, entitled "Power Converter with Power Switch Operable in Controlled Current Mode," filed on Feb. 17, 2010, now U.S. Pat. No. 8,154,261 which is a continuation of patent application Ser. No. 12/103,993, entitled "Power Converter with Power Switch Operable in Controlled Current Mode," filed on Apr. 16, 2008 (now, U.S. Pat. No. 7,679,342), which applications are incorporated herein by reference.

TECHNICAL FIELD

The present invention is directed, in general, to power electronics and, more specifically, to a power converter and method of controlling the same for selected modes of operation.

BACKGROUND

A switch-mode power converter (also referred to as a "power converter" or "regulator") is a power supply or power processing circuit that converts an input voltage waveform into a specified output voltage waveform. DC-DC power converters convert a direct current ("dc") input voltage into a dc output voltage. Controllers associated with the power converters manage an operation thereof by controlling the conduction periods of power switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of the power switches of the power converter. The duty cycle is a ratio represented by a conduction period of a power switch to a switching period thereof. Thus, if a power switch conducts for half of the switching period, the duty cycle for the power switch would be 0.5 (or 50 percent ("%")). Additionally, as voltage or current for systems, such as a microprocessor powered by the power converter, dynamically change (e.g., as a computational load on the microprocessor changes), the controller should be configured to dynamically increase or decrease the duty cycle of the power switches therein to maintain an output characteristic such as an output voltage at a desired value.

In an exemplary application, the power converters have the capability to convert an unregulated input voltage, such as five volts, supplied by an input voltage source to a lower, regulated, output voltage, such as 2.5 volts, to power a load. To provide the voltage conversion and regulation functions, the power converters include active power switches such as metal-oxide semiconductor field-effect transistors ("MOSFETs") that are coupled to the voltage source and periodically switch a reactive circuit element such as an inductor to the voltage source at a switching frequency that may be on the order of five megahertz.

In typical applications of dc-dc power converters, power conversion efficiency is an important parameter that directly affects the physical size of the end product, the cost and market acceptance. Active power switches that are either fully on with low forward voltage drop or fully off with minimal leakage current provide a recognized advantage for power conversion efficiency in comparison with previous designs that utilized a dissipative "pass" transistor to regulate an output characteristic or a passive diode to provide a rectification function. Previous designs using pass transistors and passive diodes produced operating power conversion efficiencies of roughly 40-70% in many applications. The use of active power switches in many recent power converter designs, particularly as synchronous rectifiers for low output voltages, has increased operating efficiency at full rated load to 90% or more.

A continuing problem with power converters is preserving power conversion efficiency at low levels of output current. Low efficiency at low output currents is a result of power inherently lost by parasitic elements in the power switches and by losses induced in reactive circuit elements, particularly inductors coupled to the active power switches. Further losses are also generated in the control and drive circuits coupled to the active power switches. Ultimately, as the output current of a power converter approaches zero, the fixed losses in the power switches, the inductive circuit elements, and the control circuits cause power conversion efficiency also to approach zero.

Various approaches are known to improve power conversion efficiency at low output currents. One approach used with resonant power conversion topologies reduces switching frequency of active power switches for low output current. Another approach, as described by X. Zhou, et al., in the paper entitled "Improved Light-Load Efficiency for Synchronous Rectifier Voltage Regulation Module," IEEE Transactions on Power Electronics, Volume 15, Number 5, September 2000, pp. 826-834, which is incorporated herein by reference, utilizes duty cycle adjustments to adjust switching frequency or to disable a synchronous rectifier switch. A further approach, as described by M. E. Wilcox, et al. ("Wilcox"), in U.S. Pat. No. 6,580,258, entitled "Control Circuit and Method for Maintaining High Efficiency Over Broad Current Ranges in a Switching Regulator Circuit," issued Jun. 17, 2003, which is incorporated herein by reference, generates a control signal to intermittently turn off one or more active power switches under light load operating conditions when the output voltage of the power converter can be maintained at a regulated voltage by the charge on an output capacitor. Of course, when an output voltage from a power converter is temporarily discontinued, such as when the load coupled thereto is not performing an active function, the power converter can be disabled by an enable/disable signal, generated either at a system or manual level, which is a process commonly used, even in quite early power converter designs.

However, resonant power conversion topologies are frequently a poor choice in many applications due to an inherently disadvantageous waveform structure in resonant circuits and the resulting inefficient use of semiconductor power switches to execute the resonant power conversion process at high levels of load current. Intermittently turning off one or more active power switches under light load operating conditions as described by Wilcox still generates associated switching losses when the active power switches are periodically operated to maintain charge on an output filter capacitor. Thus, the problem of providing high power conversion efficiency at light load currents still remains an unresolved issue.

Accordingly, what is needed in the art is a power converter and related method to provide high power conversion efficiency in a switch-mode power converter, especially at light load currents, that overcomes deficiencies in the prior art.

SUMMARY OF THE INVENTION

These and other problems are generally solved or circumvented, and technical advantages are generally achieved, by advantageous embodiments of the present invention, including a power converter and method of controlling the same for selected modes of operation. In one embodiment, the power converter includes a first power switch coupled to a source of electrical power and a second power switch coupled to the first power switch and to an output terminal of the power converter. The power converter also includes a controller configured to control an operation of the first and second power switches during selected modes of operation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which:

FIGS. 5A to 5D illustrate waveform diagrams of exemplary operations of a power converter in accordance with the principles of the present invention;

Corresponding numerals and symbols in the different figures generally refer to corresponding parts unless otherwise indicated, and may not be redescribed in the interest of brevity after the first instance. The figures are drawn to clearly illustrate the relevant aspects of exemplary embodiments.

DETAILED DESCRIPTION OF ILLUSTRATIVE EMBODIMENTS

The making and using of the presently exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a power converter including a controller responsive to a level of output current or other parameters to regulate an output characteristic and methods of operating the same. While the principles of the present invention will be described in the environment of a power converter, any application that may benefit from a power converter, such as a power amplifier, including a controller responsive to a level of current to regulate an output characteristic is well within the broad scope of the present invention.

Figure 1:
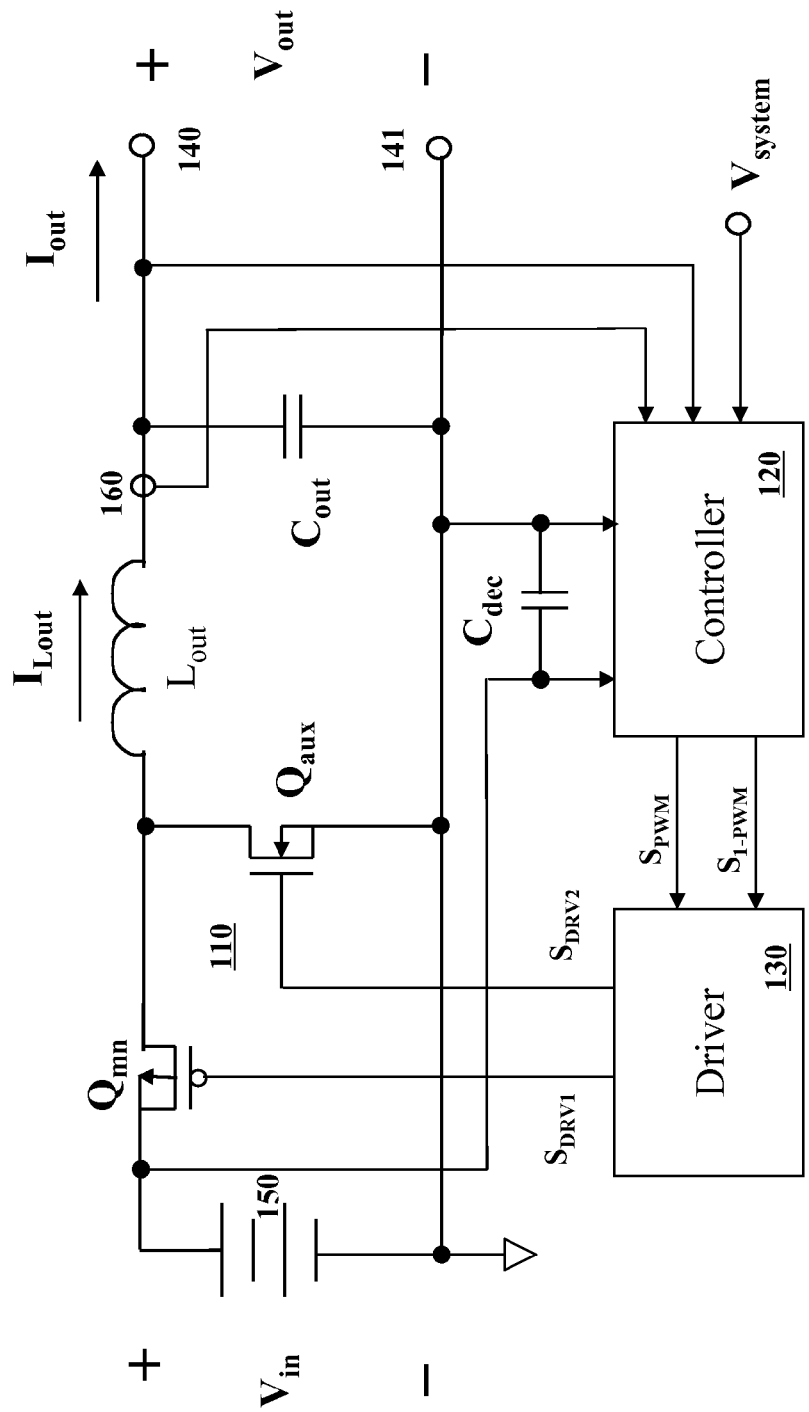
FIG. 1 illustrates a diagram of an embodiment of a power converter constructed according to the principles of the present invention.

Referring initially to FIG. 1, illustrated is a diagram of an embodiment of a power converter constructed according to the principles of the present invention. The power converter includes a power train 110, a controller 120, and a driver (e.g., a gate driver) 130, and provides power to a system/load such as a microprocessor (not shown) coupled to output terminals 140, 141. The controller 120 is responsive to a level of output current $I_{out}$ to regulate an output characteristic of the power converter. While in the illustrated embodiment the power train 110 employs a buck converter topology, those skilled in the art should understand that other converter topologies such as a forward converter topology are well within the broad scope of the present invention.

The power train 110 of the power converter receives an input voltage $V_{in}$ from a source of electrical power (represented by battery 150) at an input thereof and provides a regulated output voltage $V_{out}$ at the output terminals 140, 141, or other output characteristic such as an output current $I_{out}$. In keeping with the principles of a buck converter topology, the output voltage $V_{out}$ is generally less than the input voltage $V_{in}$, such that a switching operation of the power converter can regulate the output voltage $V_{out}$.

In a first mode of operation (also referred to as a pulse-width modulation ("PWM") mode of operation), wherein substantial output current $I_{out}$ is delivered to the output terminals 140, 141, a main power switch $Q_{mn}$ [e.g., a p-channel metal oxide semiconductor field effect transistor ("MOSFET") embodied in a p-type laterally diffused metal oxide semiconductor ("P-LDMOS") device], is enabled to conduct in response to a gate drive signal $S_{DRV1}$ for a primary interval (generally co-existent with a primary duty cycle "D" of a switching cycle) and couples the input voltage $V_{in}$ to an output filter inductor (or output inductor) $L_{out}$. During the primary interval, an inductor current $I_{Lout}$ flowing through the output inductor $L_{out}$ increases as current flows from the input to the output of the power train 110. An ac component of the inductor current $I_{Lout}$ is filtered by an output capacitor $C_{out}$ to provide the output current $I_{out}$ at an output of the power converter. The power converter generally operates in the PWM mode of operation, for example and without limitation, when the output current $I_{out}$ is of sufficient magnitude that the inductor current $I_{Lout}$ in the output inductor $L_{out}$ or in a power switch does not reverse direction.

During a complementary interval during the PWM mode of operation (generally co-existent with a complementary duty cycle "1-D" of the switching cycle), the main power switch $Q_{mn}$ is transitioned to a non-conducting state and an auxiliary power switch $Q_{aux}$ [e.g., an n-channel MOSFET embodied in an n-type laterally diffused metal oxide semiconductor ("N-LDMOS") device], coupled to the output inductor $L_{out}$, is enabled to conduct in response to a gate drive signal $S_{DRV2}$. The auxiliary power switch $Q_{aux}$ provides a path to maintain a continuity of the inductor current $I_{Lout}$ flowing through the output inductor $L_{out}$. During the complementary interval, the inductor current $I_{Lout}$ flowing through the output inductor $L_{out}$ decreases. In general, during the PWM mode of operation, the duty cycle of the main and auxiliary power switches $Q_{mn}$, $Q_{aux}$ may be adjusted to maintain a regulation of the output voltage $V_{out}$ of the power converter. Those skilled in the art should understand, however, that the conduction periods for the main and auxiliary power switches $Q_{mn}$, $Q_{aux}$ may be separated by a small time interval to avoid cross conduction therebetween and beneficially to reduce the switching losses associated with the power converter. Those skilled in the art should understand further that terms used herein such as "current reversal" or a reference to a particular level of a physical quantity such as "zero current" are to be understood within the context of a physical apparatus with attendant and practical accuracy limitations. For example, one cannot know or measure the precise instant that a current that reverses direction passes through a current level of zero.

The controller 120 of the power converter receives an output characteristic (e.g., the output current $I_{out}$ and/or the output voltage $V_{out}$) of the power converter, and a desired output characteristic such as a desired system voltage $V_{system}$ from an internal source or from an external source that may be associated with the load. In an advantageous embodiment, the controller 120 may be coupled to a current sensor, such as current sensor 160 to sense a power converter current such as an inductor current $I_{Lout}$ or the output current $I_{out}$. In a further advantageous embodiment, the controller 120 may be coupled to a current sensor to sense a current in a power switch. Thus, a current sensor may be employed by controller 120 to select the PWM mode of operation of the power converter by comparing a sensed current with a fixed or adjustable current threshold level.

The controller 120 may also be coupled to an input characteristic (e.g., the input voltage $V_{in}$) of the power converter and to a return lead of the source of electrical power (again, represented by battery 150) as illustrated in FIG. 1 to provide a ground connection therefor. While only a single ground connection is illustrated in the present embodiment, those skilled in the art should understand that multiple ground connections may be employed for use within the controller 120. A decoupling capacitor $C_{dec}$ may be coupled as illustrated in the figure to the path from the input voltage $V_{in}$ to the controller 120. The decoupling capacitor $C_{dec}$ is generally configured to absorb high frequency noise signals associated with the source of electrical power to protect the controller 120.

In accordance with the aforementioned characteristics, during the PWM mode of operation, the controller 120 provides a signal (e.g., a pulse-width modulated signal $S_{PWM}$) to control the duty cycle and a frequency of the main and auxiliary power switches $Q_{mn}$, $Q_{aux}$ of the power train 110 to regulate the output voltage $V_{out}$ or other output characteristic thereof. The controller 120 in some applications may also provide a complement of the pulse-width modulated signal $S_{PWM}$ during the PWM mode of operation (e.g., a complementary pulse-width modulated signal $S_{1\text{-}PWM}$) in accordance with the aforementioned characteristics. Any controller adapted to control at least one power switch of the power converter is well within the broad scope of the present invention. As an example, a controller employing digital circuitry is disclosed in U.S. Pat. No. 7,038,438, entitled "Controller for a Power Converter and a Method of Controlling a Switch Thereof," issued May 2, 2006, to Dwarakanath, et al., and U.S. Pat. No. 7,019,505, entitled "Digital Controller for a Power Converter Employing Selectable Phases of a Clock Signal," issued Mar. 28, 2006, to Dwarakanath, et al., which are incorporated herein by reference.

The power converter also includes a driver (e.g., a gate driver) 130 to provide gate drive signals $S_{DRV1}$, $S_{DRV2}$ to control conductivity of the main and auxiliary power switches $Q_{mn}$, $Q_{aux}$, respectively, responsive to the pulse-width modulated signal $S_{PWM}$ (and, if necessary, the control the complementary pulse-width modulated signal $S_{1\text{-}PWM}$) provided by the controller 120. There are a number of viable alternatives to implement a driver 130 that include techniques to provide sufficient signal delays to prevent crosscurrents when controlling multiple power switches in the power converter. The driver 130 typically includes switching circuitry incorporating a plurality of driver switches that cooperate to provide the gate drive signals $S_{DRV1}$, $S_{DRV2}$ to the main and auxiliary power switches $Q_{mn}$, $Q_{aux}$. Of course, any driver 130 capable of providing the gate drive signals $S_{DRV1}$, $S_{DRV2}$ to control a power switch is well within the broad scope of the present invention. As an example, a driver is disclosed in U.S. Pat. No. 7,330,017, entitled "Driver for a Power Converter and a Method of Driving a Switch Thereof," issued Feb. 12, 2008, to Dwarakanath, et al., and a power switch is disclosed in U.S. Pat. No. 7,230,302, entitled "Laterally Diffused Metal Oxide Semiconductor Device and Method of Forming the Same," issued Jun. 12, 2007, to Lotfi, et al., and in U.S. Pat. No. 7,214,985, entitled "Integrated Circuit Incorporating Higher Voltage Devices and Low Voltage Devices Therein," issued May 8, 2007, to Lotfi, et al., which are incorporated herein by reference.

According to the principles of the present invention, the main and auxiliary power switches $Q_{mn}$, $Q_{aux}$ are typically power switches that can be incorporated into a semiconductor device in an integrated circuit proximate control or signal processing devices that perform many of the control functions of the controller 120 of the power converter. The control and signal processing devices are typically complementary metal-oxide semiconductor ("CMOS") devices such as p-type metal oxide semiconductor ("PMOS") devices and n-type metal oxide semiconductor ("NMOS") devices. The PMOS and NMOS devices may also be referred to as p-channel and n-channel MOSFETs, respectively.

In a switch-mode power converter, such as the buck power converter illustrated and described with reference to FIG. 1, the duty cycle of a power switch, such as the main power switch $Q_{mn}$ previously described herein, determines the steady-state ratio of a power converter output voltage $V_{out}$ to its input voltage $V_{in}$. In particular, for a buck power converter typology operating in a continuous conduction mode ("CCM"), duty cycle determines the ratio of output voltage to input voltage (ignoring certain losses within the power converter) according to the equation:

$$D = V_{out}/V_{in}. \tag{1}$$

In an alternative power converter typology, such as a boost topology, duty cycle determines the ratio of output to input voltage (again, ignoring certain losses within the power converter) operating in a continuous conduction mode according to the equation:

$$D = V_{in}/V_{out}. \tag{2}$$

This reciprocal relationship for the ratio of input and output voltages of buck and boost topologies recognizes that a buck power converter topology employing synchronous rectifiers is operable as a boost topology with its input and output reversed, and vice versa. Other switch-mode power converter topologies such as a buck-boost, forward, Cúk, etc., are characterized by further relationships, well known in the art, for a ratio of output voltage to input voltage, for a particular operating condition such as continuous conduction mode.

A controller, such as controller 120 illustrated in FIG. 1, typically regulates an output characteristic of a power converter by controlling a duty cycle of a power switch. Duty cycle is generally controlled by comparing a sawtooth voltage waveform with a controlled threshold voltage produced by an error amplifier configured to sense an output voltage or other output characteristic.

A load coupled to a power converter may sometimes operate for a period of time in an idle mode wherein the load draws a relatively small but non-zero current from the power converter, for example, less than one percent of its normal load current. Under such operating conditions, wherein power conversion efficiency of the power converter is typically very low, it is preferable to provide high power conversion efficiency, particularly when the power converter is powered from a portable energy source such as a battery.

Figure 2:
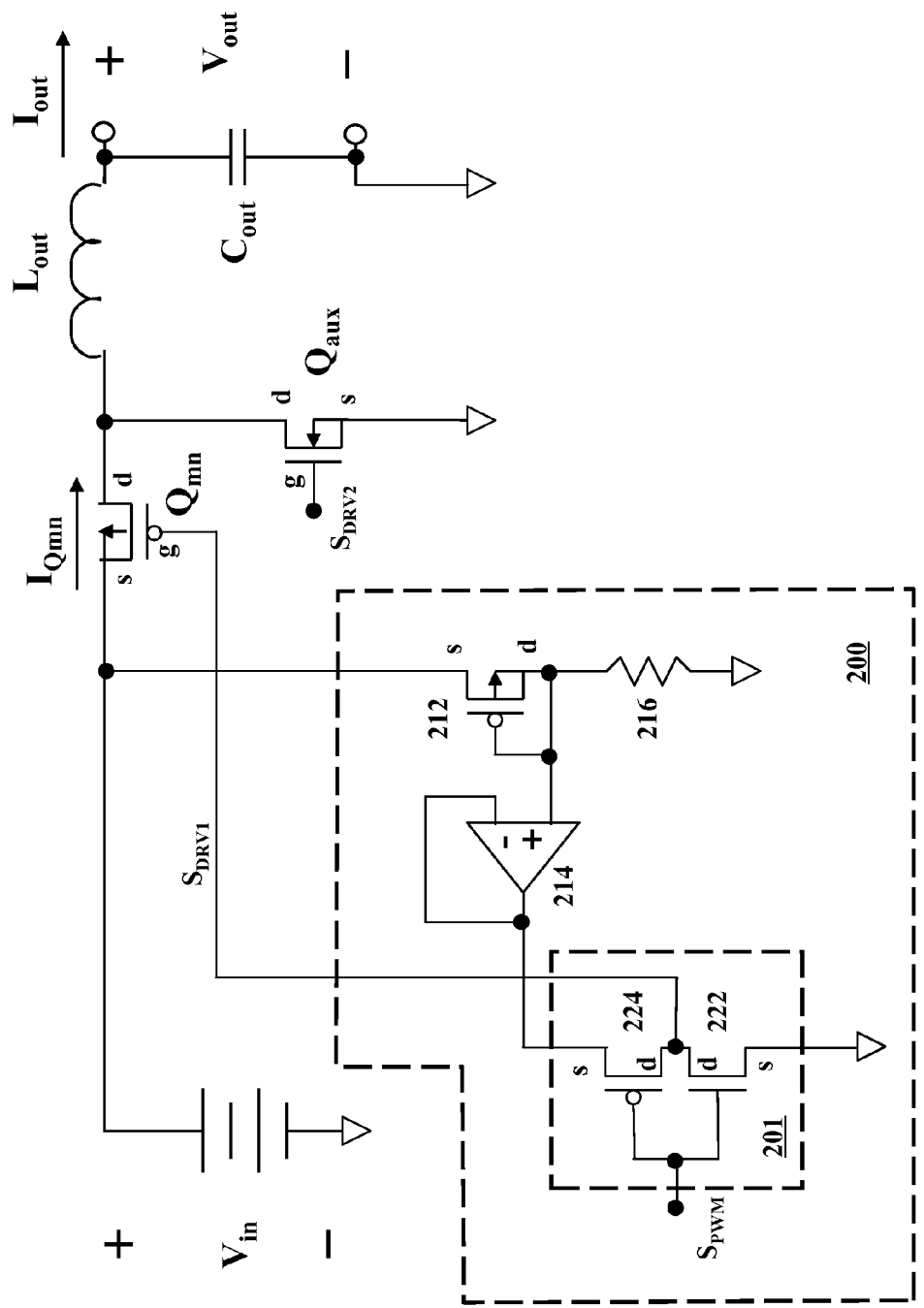
FIG. 2 illustrates a diagram of portions of the power converter illustrated in FIG. 1 constructed according to the principles of the present invention.

Referring to FIG. 2, illustrated is a diagram of portions of the power converter illustrated in FIG. 1 constructed according to the principles of the present invention. A switch-current control subsystem 200 of the power converter is configured to control a current flowing through a main power switch $Q_{mn}$ during the complementary duty cycle 1-D of a switching cycle. The switch-current control subsystem 200 includes a gate driver 201 for the main power switch $Q_{mn}$. The gate driver 201 includes driver switches such as a p-channel field-effect transistor ("FET") 224 and an n-channel FET 222, with their gates coupled together and driven by a pulse-width modulated signal $S_{PWM}$. The pulse-width modulated signal $S_{PWM}$ may be created by a controller such as the controller 120 illustrated and described with respect to FIG. 1. The source, gate, and drain of the respective driver switches are labeled with "s," "g," and "d," respectively.

Producing a current flowing through the main power switch $Q_{mn}$ during the complementary duty cycle 1-D of a switching cycle when a power converter is lightly loaded, such as producing less than five percent of its rated output power, can provide substantial efficiency improvement over a switching mode wherein both the main and auxiliary power switches $Q_{mn}$, $Q_{aux}$ are continuously enabled to conduct in complementary intervals of time. A switching mode wherein the main and auxiliary power switches $Q_{mn}$, $Q_{aux}$ are enabled to conduct in complementary intervals of time can produce substantial bidirectional current through reactive circuit elements, such as an output inductor $L_{out}$, contributing thereby substantial power losses. In addition, producing a light current flowing through the main power switch $Q_{mn}$ during the complementary duty cycle 1-D of a switching cycle when a power converter is lightly loaded can be a more economical alternative than providing a large output capacitance to maintain an output voltage $V_{out}$ of a power converter during a mode of operation wherein all switching is temporarily disabled.

The switch-current control subsystem 200 illustrated in FIG. 2 is configured to control a gate voltage for the main power switch $Q_{mn}$ when it would ordinarily be disabled to conduct (i.e., during the complementary duty cycle 1-D of a switching cycle). The gate voltage of the main power switch $Q_{mn}$ is controlled during the complementary duty cycle 1-D of a switching cycle so that the main power switch $Q_{mn}$ can conduct a controlled, light current to the load (i.e., an output current $I_{out}$ of the power converter).

When the pulse-width modulated signal $S_{PWM}$ is high, the gate driver 201 couples the gate of the main power switch $Q_{mn}$ to ground, turning it on. When pulse-width modulated signal $S_{PWM}$ is low, the gate driver 201 couples the gate of the main power switch $Q_{mn}$ to the output of an operational amplifier 214. The output of the operational amplifier 214 is controlled to enable the main power switch $Q_{mn}$ to conduct a controlled, light current (e.g., a controlled current level such as a remnant current level) when the pulse-width modulated signal $S_{PWM}$ is low.

A p-channel FET 212 with its gate coupled to its drain operates as a diode in forward conduction. The drain current of the p-channel FET 212 is controlled by a resistor 216, which is coupled substantially across the input voltage $V_{in}$ (less the diode drop of the p-channel FET 212). Thus, the gate of the p-channel FET 212 is set to the voltage with respect to its source that is necessary to conduct the current flowing through the resistor 216. This gate voltage is sensed with the operational amplifier 214 and coupled to the gate of the main power switch $Q_{mn}$ during the complementary duty cycle 1-D of a switching cycle. Thus, the p-channel FET 212 and the main power switch $Q_{mn}$ operate as a current mirror during the complementary duty cycle 1-D of a switching cycle, wherein a current controlled by the resistor 216 and scaled by a die geometric ratio of the main power switch $Q_{mn}$ to the p-channel FET 212 flows through the main power switch $Q_{mn}$. Preferably, the p-channel FET 212 and the main power switch $Q_{mn}$ are produced in a common manufacturing process and are configured to operate at substantially the same die temperature. Preferably, the p-channel FET 212 is a downscaled replica of the main power switch $Q_{mn}$. The operation of current mirrors is well known in the art, and will not be described further in the interest of brevity.

Figure 3:
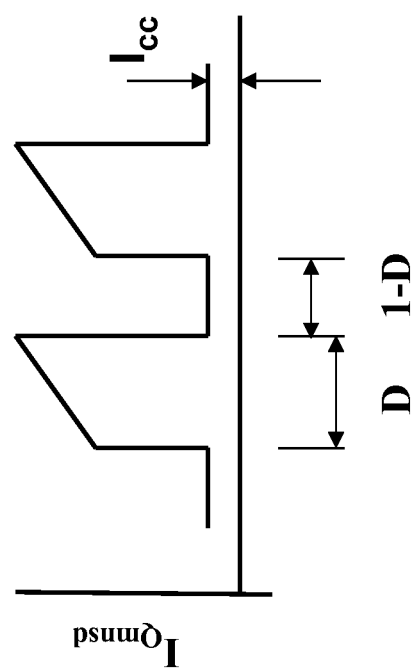
FIG. 3 illustrates a waveform diagram of an exemplary operation associated with a power switch of a power converter in accordance with the principles of the present invention.

Turning now to FIG. 3, illustrated is a waveform diagram of an exemplary operation associated with a power switch of a power converter in accordance with the principles of the present invention. In particular, the waveform represents a source-to-drain current $I_{Qmnsd}$ flowing through a power switch (e.g., the main power switch $Q_{mn}$ of FIG. 2) wherein the output current is of sufficient magnitude that current in an output inductor or in a semiconductor power switch does not reverse direction. During the primary duty cycle D of the switching cycle, the source-to-drain current $I_{Qmnsd}$ flowing through the main power switch $Q_{mn}$ increases substantially linearly due to the voltage applied across an output inductor (e.g., the output inductor $L_{out}$ of FIG. 2). During the complementary duty cycle 1-D of the switching cycle, the source-to-drain current $I_{Qmnsd}$ maintains a controlled, substantially constant current level (e.g., a remnant current level) $I_{CC}$ flowing through the main power switch $Q_{mn}$ that is controlled by a controller such as the switch-current control subsystem 200 of FIG. 2.

Figure 4:
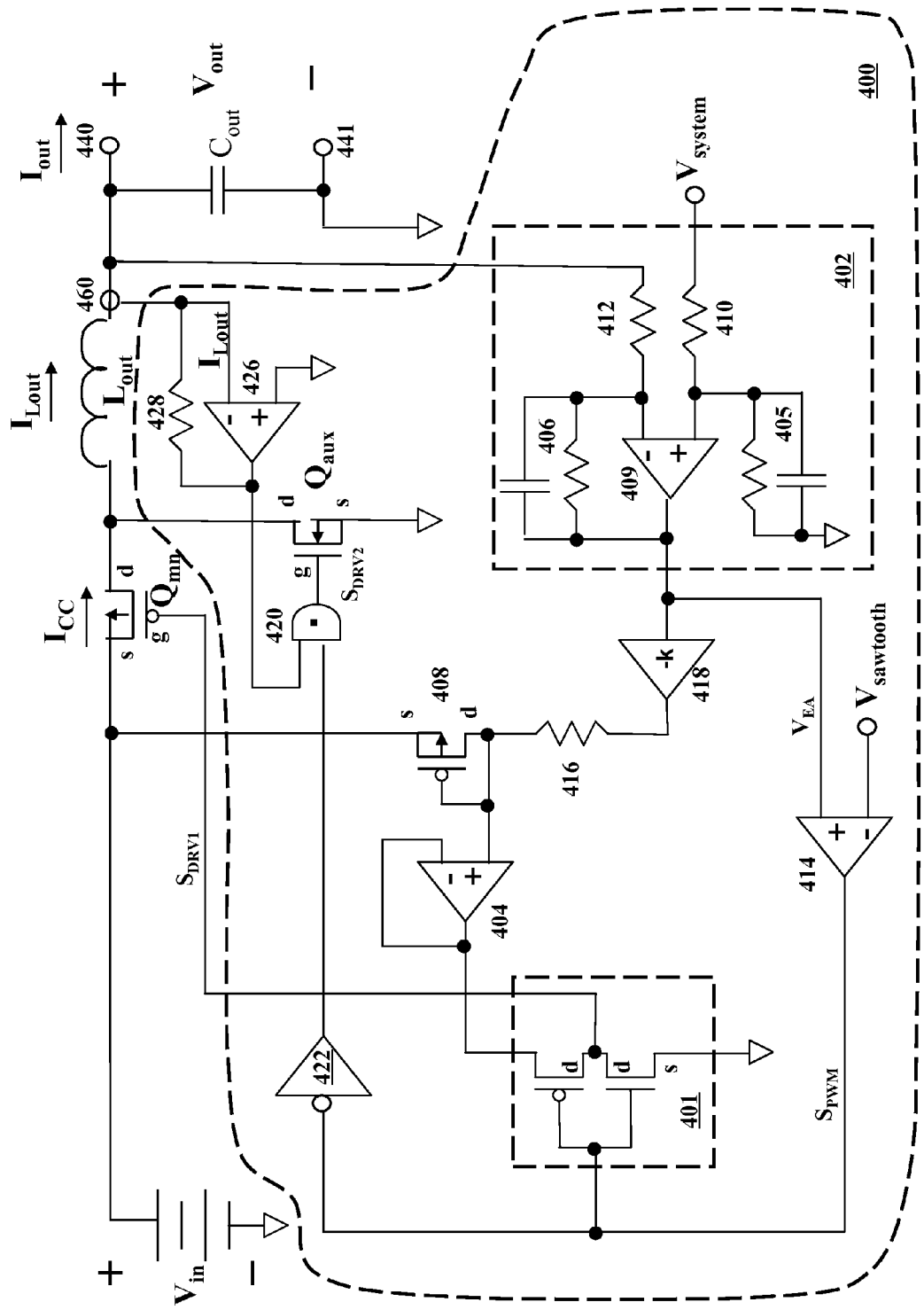
FIG. 4 illustrates a diagram of an embodiment of portions of a power converter constructed according to the principles of the present invention.

Turning now to FIG. 4, illustrated is a diagram of an embodiment of portions of a power converter constructed according to the principles of the present invention. A controller 400 of the power converter is operable in different modes of operation. The controller 400 regulates an output characteristic of the power converter, and is configured to control current (e.g., a controlled or remnant current level $I_{CC}$) through a main power switch $Q_{mn}$ in response to a sensed or estimated power converter current. The controller 400 is advantageously operable to provide a mode of operation wherein improved power conversion efficiency is achieved at light load. Additionally, the power converter may experience an improvement in dynamic response because of an additional bias available to feed an output thereof that in turn produces a smaller decay of an output characteristic (e.g., an output voltage $V_{out}$) since the output voltage $V_{out}$ is not supplied only by an output capacitor $C_{out}$. The power converter includes an error amplifier 402 that senses the output voltage $V_{out}$ as an output characteristic to provide a feedback signal.

The primary and complementary duty cycles D, 1-D of a switching cycle are established by a comparator 414 that produces a pulse-width modulated signal $S_{PWM}$. The noninverting input of the comparator 414 is coupled to an error amplifier signal $V_{EA}$ of the error amplifier 402. The inverting input of the comparator 414 is coupled to a sawtooth waveform signal $V_{sawtooth}$ that has a substantial positive voltage offset for the waveform valleys.

In a first or PWM mode of operation wherein a substantial current (an output current $I_{out}$) is delivered to a load (not shown) coupled to output terminals 440, 441, the main and auxiliary power switches $Q_{mn}$, $Q_{aux}$ are alternately enabled to conduct, respectively, during a primary duty cycle D and a complementary duty cycle 1-D. The primary duty cycle D and the complementary duty cycle 1-D are controlled to regulate an output characteristic of the power converter. During the PWM mode of operation, the load current (i.e., an output current $I_{out}$ of the power converter) is of sufficient magnitude so that an inductor current $I_{Lout}$ flowing through output inductor $L_{out}$ does not reverse direction. During the complementary duty cycle 1-D, the main power switch $Q_{mn}$ conducts a current controlled (e.g., a controlled current level $I_{CC}$) by a current mirror including a gate driver 401, an operational amplifier 404, a p-channel FET 408 and a resistor 416. The current mirror is operable in a manner similar to that described with reference to FIG. 2. However, in the circuit illustrated in FIG. 4, the current through the main power switch $Q_{mn}$ is controlled by current flowing through the resistor 416. The resistor 416 is coupled to the error amplifier signal $V_{EA}$ via an inverter 418. The inverter 418 amplifies the output of the error amplifier 402 with gain -k. Thus, as the voltage of the error amplifier signal $V_{EA}$ is reduced, the current flowing through the resistor 416 is also reduced. Correspondingly, as the voltage of the error amplifier signal $V_{EA}$ is reduced, the current flowing through the main power switch $Q_{mn}$ during the complementary duty cycle 1-D of the switching cycle is also reduced.

The error amplifier 402 senses the output voltage $V_{out}$. The error amplifier 402 includes an operational amplifier 409 that includes feedback networks 405, 406. The feedback networks 405, 406 include a parallel arrangement of a capacitor and a resistor. The error amplifier 402 further includes input networks including resistors 410, 412. In a preferred embodiment, the values of components in feedback networks 405, 406 are equal, and the values of the resistors 410, 412 in the input networks are equal. The selection of component values for an error amplifier to produce a stable response of a power converter in a particular application is well known in the art, and will not be described further in the interest of brevity. The error amplifier 402 generates the error amplifier signal $V_{EA}$ in response to the sensed output voltage $V_{out}$ of the power converter and a desired system voltage $V_{system}$. Of course, different arrangements of feedback and input networks to meet the needs of a particular application including a voltage divider coupled across output terminals 440, 441 are well within the broad scope of the invention. Thus, in the PWM mode of operation, the controller 400 enables alternating conduction of the main and auxiliary power switches $Q_{mn}$, $Q_{aux}$ while enabling a controlled current (e.g., a controlled current level $I_{CC}$) flowing through the main power switch $Q_{mn}$ during the complementary duty cycle 1-D. The controlled current flowing through the main power switch $Q_{mn}$ is responsive to the error amplifier signal $V_{EA}$ produced by the error amplifier 402.

In a second mode operation (also referred to as a hybrid mode of operation), the power converter output current $I_{out}$ is insufficient to sustain unidirectional current flow in the output inductor $L_{out}$ as described with respect to the PWM mode of operation. Bidirectional current flow through output inductor $L_{out}$ is prevented in the power converter illustrated in FIG. 4 by sensing the inductor current $I_{Lout}$ with a current sensor 460. The sensed inductor current $I_{Lout}$ is amplified with a transresistance amplifier that includes operational amplifier 426 coupled to feedback resistor 428. The gain of the transresistance amplifier is substantially the resistance of the resistor 428. The output of the transresistance amplifier is coupled to an input of an AND gate 420.

The output of the comparator 414 is coupled to a signal inverter 422. The signal inverter 422 produces a high output signal during the complementary duty cycle 1-D of the switching cycle. The output of the signal inverter 422 is coupled to the other input of the AND gate 420. Thus, the AND gate 420 produces a high gate drive signal $S_{DRV2}$ for the auxiliary power switch $Q_{aux}$ to enable conduction therein during the complementary duty cycle 1-D of the switching cycle, when positive inductor current $I_{Lout}$ flows through the output inductor $L_{out}$. In accordance therewith, the polarity of the current sensor 460 is selected, as would be known by one with ordinary skill in the art, to produce a sense of the signal at the output of operational amplifier 426 to enable conduction in the auxiliary power switch $Q_{aux}$ during the complementary duty cycle 1-D of the switching cycle, when positive current flows through the output inductor $L_{out}$. The current mirror previously described continues to provide a gate drive signal $S_{DRV1}$ for the main power switch $Q_{mn}$ to enable a current controlled by the error amplifier 402 to flow therethrough during the complementary duty cycle 1-D of the switching cycle. In this manner, during the hybrid mode of operation, a controlled current (e.g., a controlled current level $I_{CC}$) is enabled to flow through the main power switch $Q_{mn}$ when the auxiliary power switch $Q_{aux}$ is disabled to conduct during the complementary duty cycle 1-D of the switching cycle. The controller, therefore, is configured to control a level of current (again, e.g., a controlled current level $I_{CC}$) in the main power switch $Q_{mn}$ when the auxiliary power switch $Q_{aux}$ is substantially disabled to conduct (e.g., during the complementary duty cycle 1-D of the switching cycle).

In a third mode operation (also referred to as a light current mode of operation), the output current $I_{out}$ is further reduced so that a source-to-drain current that flows through the main power switch $Q_{mn}$ is controlled to the controlled current level $I_{CC}$ to maintain sufficient current to power the load. As in the PWM and hybrid modes of operation, the error amplifier 402 can be used to control current flowing to the output terminal 440, thereby regulating an output characteristic of the power converter. In the light current mode of operation, the alternately enabled conduction of the main and auxiliary power switches $Q_{mn}$, $Q_{aux}$ is disabled, since the source-to-drain current that flows through the main power switch $Q_{mn}$ is sufficient to power the load.

Figure 5A:
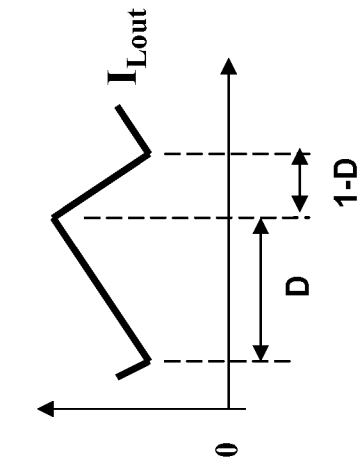
Figure 5A:
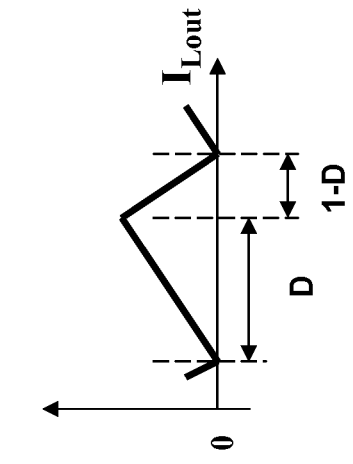

Turning now to FIGS. 5A to 5D, illustrated are waveform diagrams of exemplary operations of a power converter in accordance with the principles of the present invention. In the interest of maintaining continuity, the waveform diagrams will be described in part with reference to signals and components illustrated and described with respect to FIG. 4. More particularly, a left portion of FIG. 5A illustrates an error amplifier signal $V_{EA}$ produced by the error amplifier 402 and a voltage sawtooth signal $V_{sawtooth}$ produced by a sawtooth voltage generator (not shown) in the PWM mode of operation. When the error amplifier signal $V_{EA}$ is greater then the voltage sawtooth signal $V_{sawtooth}$ produced by the sawtooth voltage generator, the comparator 414 illustrated in FIG. 4 sets the primary duty cycle D of the switching cycle. In the right portion of FIG. 5A is a graphical representation of the resulting inductor current $I_{Lout}$ that flows through the output inductor $L_{out}$. During the primary duty cycle D of the switching cycle, the inductor current $I_{Lout}$ flowing through the output inductor $L_{out}$ increases, and during the complementary duty cycle 1-D, the inductor current $I_{Lout}$ decreases. In the right portion of FIG. 5A, the load current (e.g., an output current $I_{out}$ of the power converter) is sufficiently high so that inductor current $I_{Lout}$ in the output inductor $L_{out}$ does not reverse.

Figure 5B:
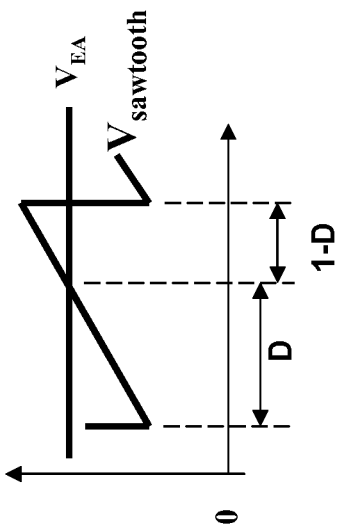
Figure 5B:
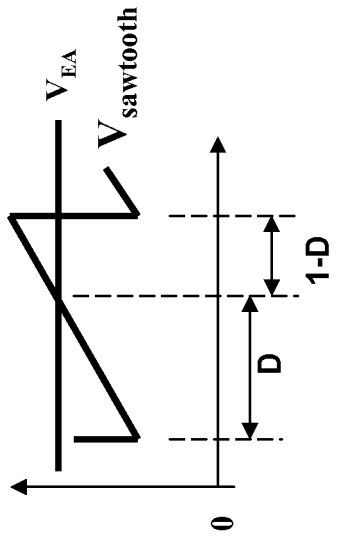

Referring now to FIG. 5B, illustrated in the left portion of the figure again is a graphical representation of the error amplifier signal $V_{EA}$ produced by the error amplifier 402 and the voltage sawtooth signal $V_{sawtooth}$ produced by a sawtooth voltage generator, again in the PWM mode of power converter operation. In the right portion of FIG. 5B, the inductor current $I_{Lout}$ flowing through the output inductor $L_{out}$ is again illustrated. In this case, the inductor current $I_{Lout}$ flowing through output inductor $L_{out}$ reaches zero at the end of the switching cycle, but does not reverse direction, and thus preserving operation in the PWM mode of operation.

Referring now to FIG. 5C, illustrated in the left portion of the figure is a graphical representation of the error amplifier signal $V_{EA}$ produced by the error amplifier 402 and the voltage sawtooth signal $V_{sawtooth}$ produced by a sawtooth voltage generator in a hybrid mode of operation. In the right portion of FIG. 5C, the inductor current $I_{Lout}$ flowing through the output inductor $L_{out}$ is again illustrated. In this case, the inductor current $I_{Lout}$ flowing through the output inductor $L_{out}$ would reach zero and reverse direction during the complementary duty cycle 1-D. In this hybrid mode of operation, the output current $I_{out}$ is insufficient to prevent current reversal in output inductor $L_{out}$ unless accommodation is provided in the power converter. Accommodation is provided by the AND gate 420 illustrated in FIG. 4 that disables conduction in the auxiliary power switch $Q_{aux}$ when the inductor current $I_{Lout}$ flowing through the output inductor $L_{out}$ reaches substantially zero or is less than zero. Thus, a controlled or remnant current level $I_{CC}$ is supplied through the main power switch $Q_{mn}$ to the output inductor $L_{out}$, thereby maintaining the inductor current $I_{Lout}$ as shown. The result is a substantial reduction of ripple current conducted to output capacitor $C_{out}$ with attendant reduction in switching-induced losses in associated circuit components.

Referring now to FIG. 5D, illustrated in the left portion of the figure is a graphical representation of the error amplifier signal $V_{EA}$ produced by the error amplifier 402 and the voltage sawtooth signal $V_{sawtooth}$ produced by a sawtooth voltage generator in a light current mode of operation. In this mode, the output current $I_{out}$ has been reduced even further so that output current $I_{out}$ can be sustained by the controlled current level $I_{CC}$ flowing through the main power switch $Q_{mn}$ without alternately enabling conduction through the main and auxiliary power switches $Q_{mn}$, $Q_{aux}$. In this mode, a reduced voltage level for the error amplifier signal $V_{EA}$ produced by the error amplifier 402 causes the error amplifier signal $V_{EA}$ to lie below even the valleys of the sawtooth waveform signal $V_{sawtooth}$. When the error amplifier signal $V_{EA}$ lies entirely below the sawtooth waveform signal $V_{sawtooth}$, the comparator 414 produces no duty cycle (e.g., disabling the duty cycle). As illustrated in the right portion of FIG. 5D, the inductor current $I_{Lout}$ that flows through the output inductor $L_{out}$ is maintained at the controlled current level $I_{CC}$ flowing through the main power switch $Q_{mn}$, controlled by the error amplifier 402 by means of the current mirror as described previously. The result is an output current $I_{out}$ controlled by the error amplifier 402 that flows to the load without active switching of either the main power switch $Q_{mn}$ or the auxiliary power switch $Q_{aux}$. Little to no ripple current is produced, and switching losses are substantially eliminated. Power conversion efficiency in this mode of operation is substantially improved and is determined by the ratio of output voltage $V_{out}$ to input voltage $V_{in}$ and remaining losses in the power converter elements. In this mode of operation, some controller elements can be selectively disabled to further reduce power losses.

If, in an alternative embodiment, the level of controlled current level $I_{CC}$ for the main power switch $Q_{mn}$ is not controlled by the error amplifier 402 in response to actual load current at light levels of load current (i.e., a preselected level of controlled current level $I_{CC}$ is chosen), it is important that the preselected level of controlled current level $I_{CC}$ for the main power switch $Q_{mn}$ be less than the expected level of load current (again, the output current $I_{out}$ of the power converter) when the load is in a low-current state. Otherwise, the output voltage $V_{out}$ of the power converter can increase beyond a desired voltage level.

Figure 6A:
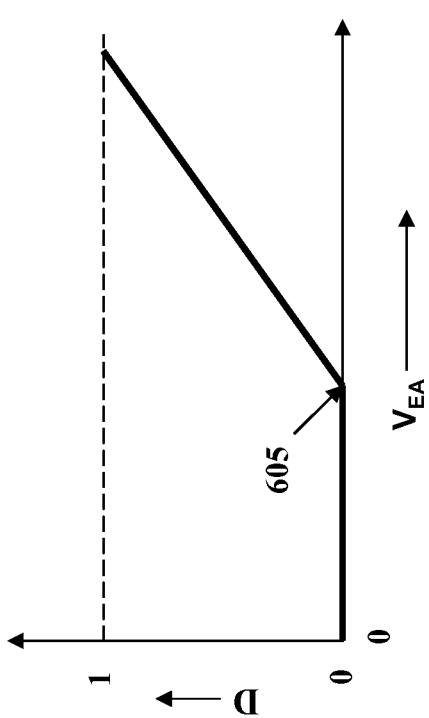
FIGS. 6A and 6B illustrate waveform diagrams of exemplary operations associated with a power switch of a power converter in accordance with the principles of the present invention.
Figure 6B:
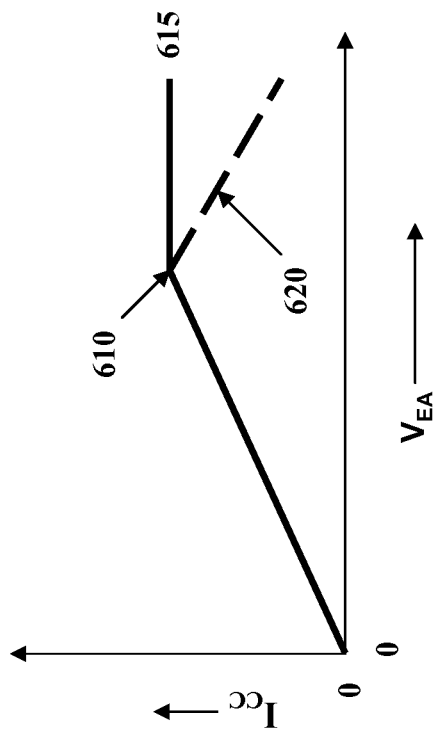

Turning now to FIGS. 6A and 6B, illustrated are waveform diagrams of exemplary operations associated with a power switch of a power converter in accordance with the principles of the present invention. In the interest of maintaining continuity, the waveform diagrams will be described in part with reference to signals and components illustrated and described with respect to FIG. 4. FIG. 6A illustrates a graphical representation of a primary duty cycle D resulting from the error amplifier signal $V_{EA}$ produced by the error amplifier 402. When the error amplifier signal $V_{EA}$ is less than a threshold level 605, no duty cycle is produced (e.g., disabling the duty cycle). When the error amplifier signal $V_{EA}$ is above the threshold level 605, the primary duty cycle D increases linearly with the error amplifier signal $V_{EA}$ until it reaches 100%. In a preferred embodiment, the error amplifier 402 is constructed to produce an error amplifier signal $V_{EA}$ that can fall below the minimum voltage of the sawtooth waveform signal $V_{sawtooth}$ to provide a mode of operation wherein no duty cycle is produced (e.g., disabling the duty cycle).

Referring now to FIG. 6B, illustrated is a graphical representation of a controlled or remnant current level $I_{CC}$ that flows through the main power switch $Q_{mn}$ during, for instance, the complementary duty cycle 1-D of the switching cycle as a function of the error amplifier signal $V_{EA}$ produced by the error amplifier 402. In a preferred embodiment, above an error amplifier voltage level 610, the controlled current level $I_{CC}$ attains a saturation level 615. In an alternative embodiment, above the error amplifier voltage level 610, the controlled current level $I_{CC}$ is reduced as the error amplifier signal $V_{EA}$ increases beyond the error amplifier voltage level 610 produced by the error amplifier 402 as represented by dashed line 620. While the controlled current level $I_{CC}$ illustrated in FIG. 6B are represented by straight lines, it is contemplated that these lines may be implemented as nonlinear functions of the error amplifier signal $V_{EA}$ to produce further efficiency enhancements associated with a particular application.

As mentioned above, the power converter includes a controller configured to provide a plurality of modes of operation. In a PWM mode of operation, the main and auxiliary power switches are alternately enabled to conduct in substantially complementary portions of a switching cycle in response to an output characteristic, such as an output voltage of the power converter. A beginning time of a switching cycle is ordinarily controlled by a switching cycle (e.g., frequency) clock. In the PWM mode of operation, the controller controls the level of current in the main power switch with an error amplifier with an input coupled to an output characteristic of the power converter such an output voltage.

The controller controls the level of current (e.g., a controlled current level such as a remnant current level) in the main power switch during the complementary duty cycle 1-D of the switching cycle when the auxiliary power switch is enabled to conduct (i.e., during an interval of time that begins substantially after the auxiliary power switch is enabled to conduct and ends substantially when the main power switch enabled to conduct). The controller may employ a current mirror to control the remnant current level in the main power switch. In the PWM mode of operation and to enhance power conversion efficiency, the controller preferably reduces the remnant current level in the main power switch during the complementary duty cycle 1-D in response to an increase of a sensed current of the power converter, such as an output current.

In a light current mode of operation (which may occur after the PWM mode of operation), when a current detected in the auxiliary power switch is less than a current threshold level, the controller disables the alternately enabled conduction of the main and auxiliary power switches and controls a remnant current level in the main power switch to regulate the output characteristic. In the light current mode of operation, the controller includes an error amplifier coupled to an output characteristic of the power converter such as the output voltage of the power converter to control the remnant current level in the main power switch. To enhance power conversion efficiency in the light current mode of operation, the controller selectively disables controller elements such as the operational amplifier 409 of the error amplifier 402 and the comparator 414 illustrated in FIG. 4 and the bias sources thereto.

In a recharge mode of operation (which may occur following the light current mode of operation), the main and auxiliary power switches are alternately enabled to conduct in substantially complementary portions of a switching cycle in response to an output characteristic, such as an output voltage of the power converter. The controller, however, controls a conduction of the main power switch to provide a level of current (e.g., a controlled current level such as a remnant current level) in the main power switch when a level of current in the main power switch crosses an upper current threshold level, which may be a fixed upper current threshold level. The controller also enables conduction in the auxiliary power switch when the level of current in the main power switch crosses the upper current threshold level. The controller may also perform the aforementioned operations in accordance with monitoring an inductor current (as opposed or in addition to the current in the main power switch) of an output inductor of a power converter employing the main and auxiliary power switches. Thereafter, the controller disables conduction in the auxiliary power switch when a level of current in the auxiliary power switch crosses a lower current threshold level (e.g., approximately zero current) to prevent reverse current flow in an output inductor or the auxiliary power switch. In a particular application, it can be advantageous to allow a small reverse current flow in the output inductor or the auxiliary power switch to enable substantially zero voltage switching of the main power switch, thereby reducing switching losses.

The controller transitions between modes of operation by testing operational parameters in the power converter. In the PWM mode of operation, the controller transitions to the light current mode of operation when a level of current in the auxiliary power switch or in the output inductor is reduced to a current threshold level such as zero current when a discontinuous current mode ("DCM") is reached. The controller transitions from the light current mode of operation to the recharge mode of operation and resets a switching cycle counter when an output characteristic falls below a lower output characteristic threshold level such as a lower output voltage threshold level.

In the recharge mode of operation, the controller transitions back to the PWM mode of operation when a switching cycle counter exceeds a predetermined count. In the recharge mode of operation, the controller transitions to the light current mode of operation when the output characteristic such as the output voltage exceeds an upper output characteristic threshold level, such as an upper output voltage threshold level. In the recharge mode of operation, the controller enables conduction in the main power switch with a switching cycle clock (e.g., a switching cycle clock employed to initiate a switching cycle). When the controller initially enters the recharge mode of operation, the controller initiates a count of switching cycles in accordance with a switching cycle counter.

Figure 7:
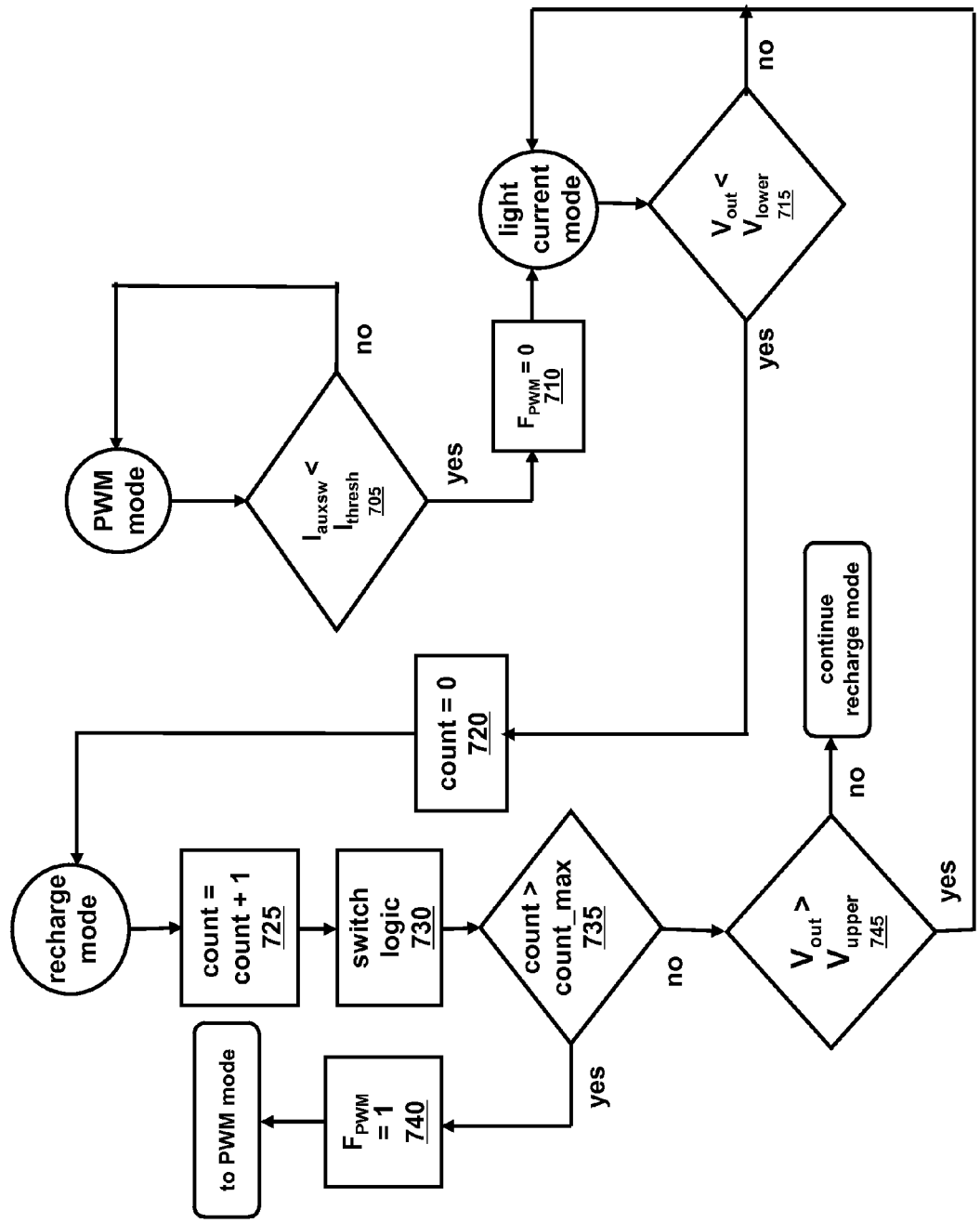
FIGS. 7 and 8 illustrate flow diagrams of embodiments of methods of operating a controller in accordance with the principles of the present invention.

Turning now to FIG. 7, illustrated is a flow diagram of an embodiment of a method of operating a controller in accordance with the principles of the present invention. In addition to the exemplary order that follows, it should be understood that the method may begin at one of the described modes of operation. For instance, the controller may begin in a recharge mode of operation and follow the method of operation therefrom as provided below.

Beginning in a PWM mode of operation, the controller samples a current, such as an auxiliary power switch current $I_{auxsw}$ (or an inductor current in an output inductor of a power converter), and compares the auxiliary power switch current $I_{auxsw}$ to a current threshold level $I_{thresh}$, in a step or module 705. If the auxiliary power switch current $I_{auxsw}$ is less than the current threshold level $I_{thresh}$ the controller sets a flag $F_{PWM}$ to zero in a step or module 710 to disable the PWM mode of operation and transitions to a light current mode of operation. Otherwise, the controller continues in the PWM mode of operation and iteratively performs step 705 until the auxiliary power switch current $I_{auxsw}$ exceeds the current threshold level $I_{thresh}$ or the controller changes the mode of operation based on another process therein.

In the light current mode of operation, the controller compares an output characteristic (e.g., an output voltage $V_{out}$) of the power converter to a lower output characteristic threshold level (e.g., a lower output voltage threshold level $V_{lower}$) in a step or module 715. If the output voltage $V_{out}$ is less than the lower output voltage threshold level $V_{lower}$, the controller resets a switching cycle counter, for example, to zero in a step or module 720, and transitions to a recharge mode of operation. Otherwise, the controller continues in the light current mode of operation and iteratively performs step 715 until the output voltage $V_{out}$ exceeds the lower output voltage threshold level $V_{lower}$ or the controller changes the mode of operation based on another process therein In the recharge mode of operation during each switching cycle, the controller increments the switching cycle counter in a step or module 725 and executes a switch logic in a step or module 730 as described below with respect to FIG. 8. The controller then compares the count of the switching cycle counter to a predetermined count such as a maximum count (designated "count_max") in a step or module 735. If the count exceeds the maximum count, the controller sets a flag $F_{PWM}$ equal to one to enable the PWM mode of operation in the following switching cycle in a step or module 740 and then exits to the PWM mode of operation. Otherwise, the controller then compares an output characteristic (e.g., an output voltage $V_{out}$) of the power converter to an upper output characteristic threshold level (e.g., an upper output voltage threshold level $V_{upper}$) in a step or module 745. If the output voltage $V_{out}$ is greater than the upper output voltage threshold level $V_{upper}$, the controller transitions to the light current mode of operation. Otherwise, the controller continues in the recharge mode of operation and iteratively performs steps 725, et seq., until the controller changes the mode of operation based thereon or another process therein.

Figure 8:
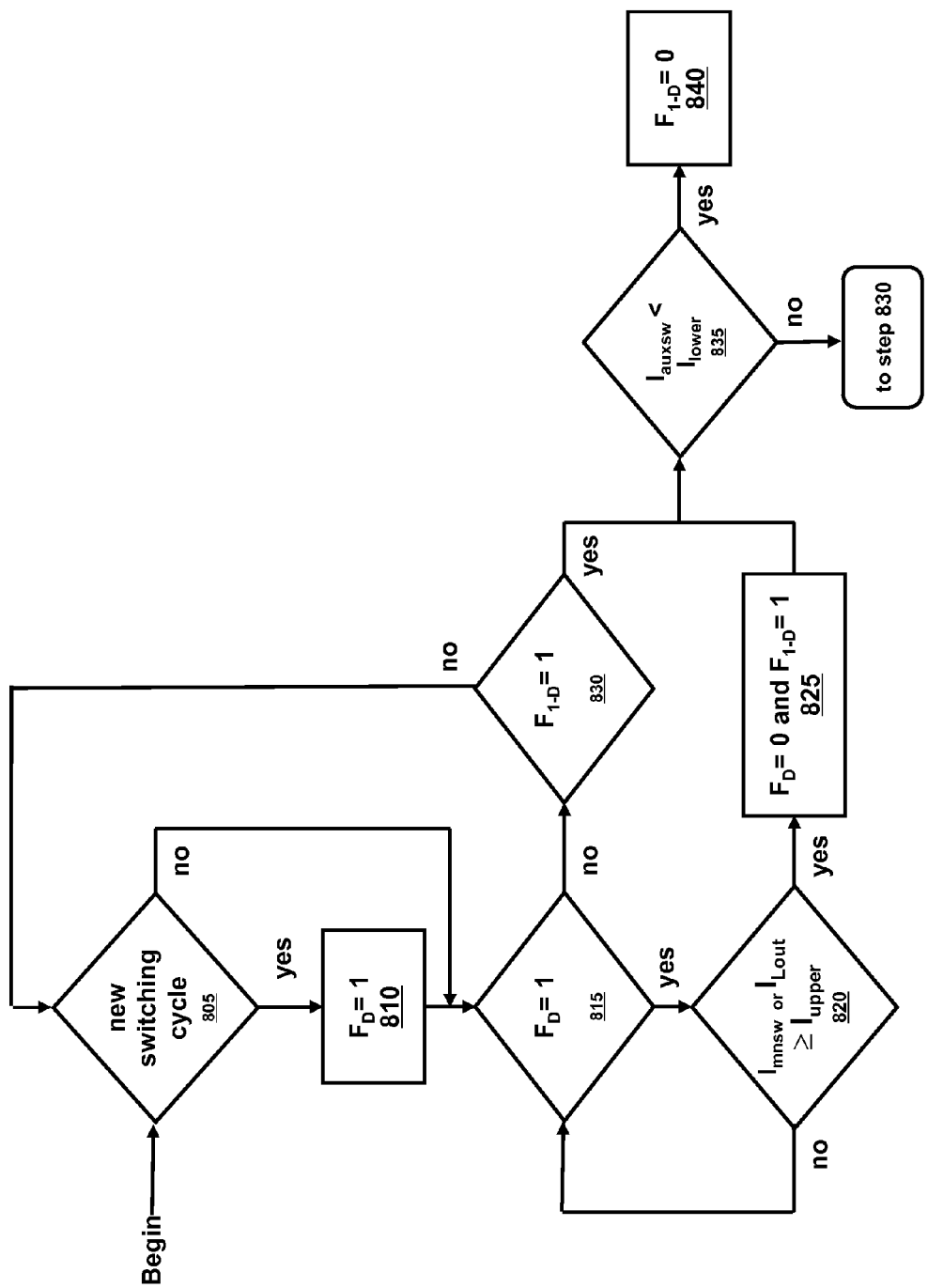

Turning now to FIG. 8, illustrated is a flow diagram of an embodiment of a method of operating a controller in accordance with the principles of the present invention. The exemplary method of FIG. 8 demonstrates an operation of the switch logic introduced above with respect to FIG. 7. In a step or module 805, the controller determines if a new switching cycle is beginning (e.g., as indicated by a time 910 illustrated in FIGS. 9A and 9B below). If a new switching cycle is beginning, the controller sets a flag $F_D$ to one to enable conduction of a main power switch in a step or module 810. If it is not the beginning of a new switching cycle, the controller determines if the flag $F_D$ is equal to one in a step or module 815. If the value of the flag $F_D$ is equal to one, the controller determines if a main power switch current $I_{auxsw}$ or an inductor current $I_{Lout}$ in an output inductor exceeds an upper current threshold level $I_{upper}$ in a step or module 820. If the main power switch current $I_{mnsw}$ or an inductor current $I_{Lout}$ exceeds the upper current threshold level $I_{upper}$, the flag $F_D$ is reset to zero and a conductivity of the main power switch is reduced to provide a controlled current level (e.g., a remnant current level) in a step or module 825. Additionally, a flag $F_{1-D}$ is set to one to enable conduction of an auxiliary power switch in the step or module 825. If the main power switch current $I_{mnsw}$ or an inductor current $I_{Lout}$ does not exceed the upper current threshold level $I_{upper}$, the controller continues the conduction of the main power switch and iteratively performs step 815, et seq.

If the value of the flag $F_D$ is not equal to one, the controller determines if a flag $F_{1-D}$ is equal to one in a step or module 830. If the value of the flag $F_{1-D}$ is not equal to one, the controller returns to step 805 or performs other processes therein. If the value of the flag $F_{1-D}$ is equal to one (see also step or module 825 introduced above), the controller determines if an auxiliary power switch current $I_{auxsw}$ is less than a lower current threshold level $I_{lower}$ in a step or module 835. If the auxiliary power switch current $I_{auxsw}$ is less than the lower current threshold level $I_{lower}$, the flag $F_{1-D}$ is reset to zero and a conductivity of the auxiliary power switch is disabled in a step or module 840. Thereafter, the controller may return to step 805 or perform other processes therein. If the auxiliary power switch current $I_{auxsw}$ is not less than the lower current threshold level $I_{lower}$, the controller continues the conduction of the auxiliary power switch and iteratively performs step 830, et seq.

Figures 9A, 9B:
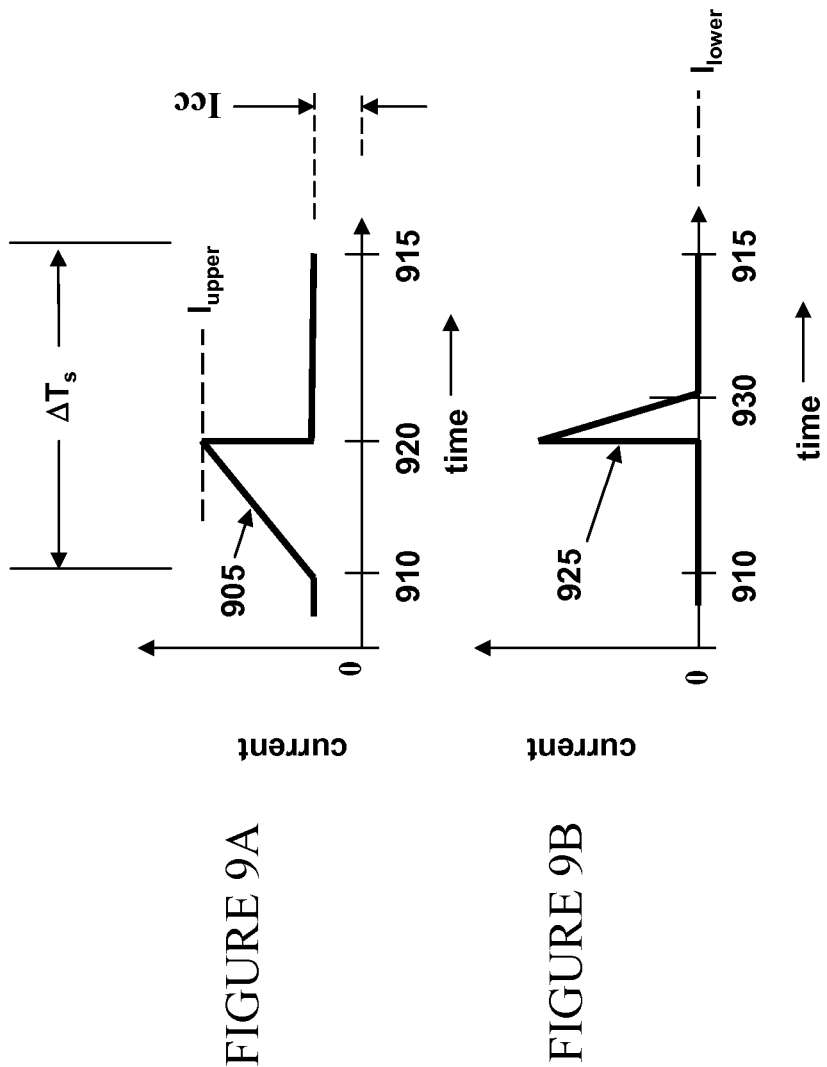
FIGS. 9A and 9B illustrate waveform diagrams of exemplary operations associated with power switches of a power converter in accordance with the principles of the present invention.

Turning now FIGS. 9A and 9B, illustrated are waveform diagrams of exemplary operations associated with power switches of a power converter in accordance with the principles of the present invention. The waveforms illustrate currents flowing through main and auxiliary power switches in a recharge mode of operation. The waveform 905 represents current flowing through the main power switch during a switching cycle of period $\Delta T_s$ that begins at time 910 and ends at time 915. The current in the main power switch is enabled to conduct at the time 910 by a switching cycle clock. The current in the main power switch increases until it reaches an upper current threshold level ("$I_{upper}$") at time 920, at which time conductivity of the main power switch is reduced to provide a controlled current level (e.g., a remnant current level $I_{cc}$) by the controller. At the time 920, conductivity of the auxiliary power switch is enabled to conduct as represented by the waveform 925. The current in the auxiliary power switch decreases until it crosses a lower current threshold level ("$I_{lower}$") at time 930, and remains substantially zero until the end of the switching cycle at time 915.

Figure 10:
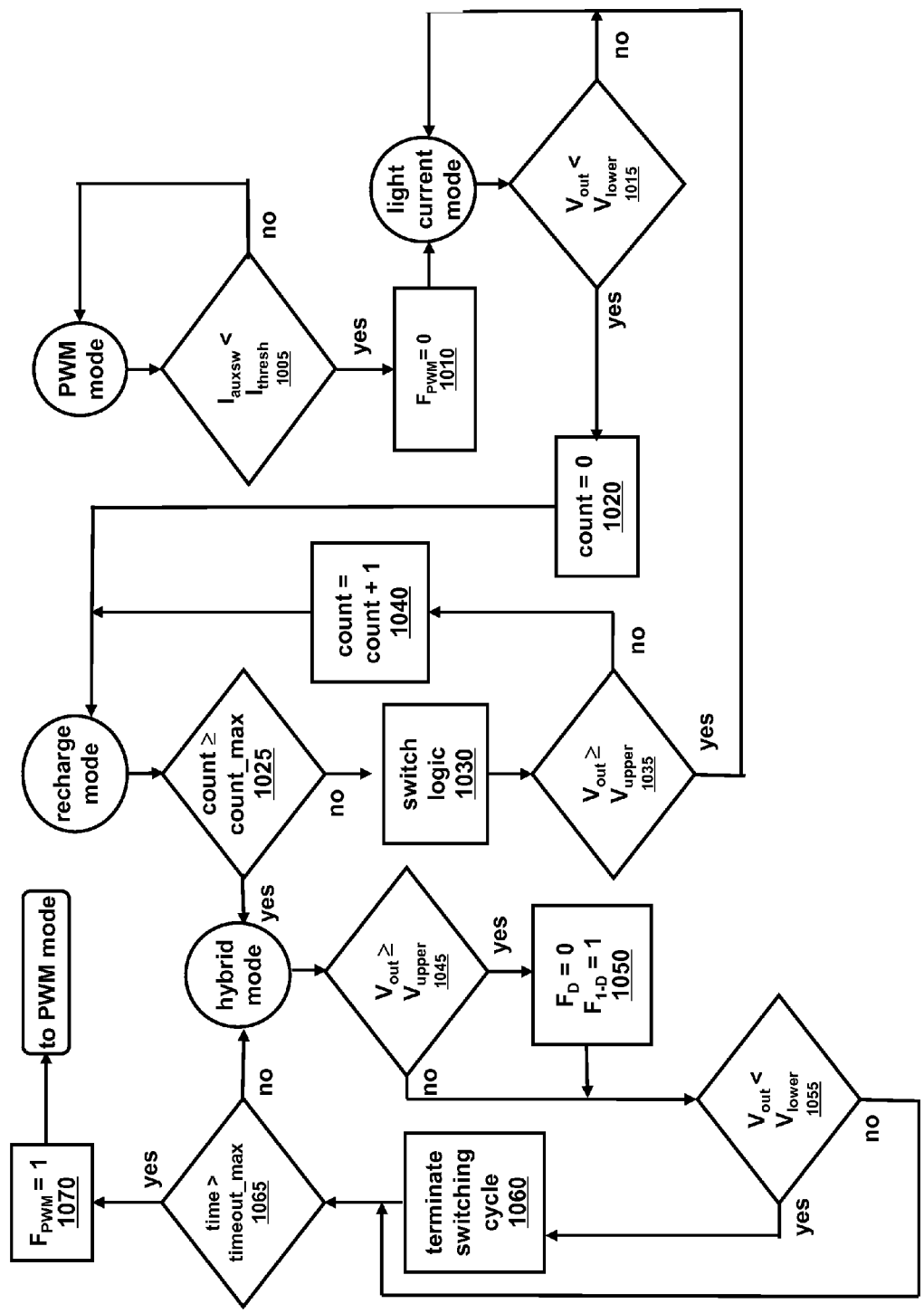
FIGS. 10 and 11 illustrate flow diagrams of embodiments of methods of operating a controller in accordance with the principles of the present invention.

Turning now to FIG. 10, illustrated is a flow diagram of an embodiment of a method of operating a controller in accordance with the principles of the present invention. In addition to the exemplary order that follows, it should be understood that the method may begin at one of the described modes of operation. For instance, the controller may begin in a recharge mode of operation and follow the method of operation therefrom as provided below.

Beginning in a PWM mode of operation, the controller samples a current, such as an auxiliary power switch current $I_{auxsw}$ (or an inductor current in an output inductor of a power converter), and compares the auxiliary power switch current $I_{auxsw}$ to a current threshold level $I_{thresh}$, in a step or module 1005. If the auxiliary power switch current $I_{auxsw}$ is less than the current threshold level $I_{thresh}$, the controller sets a flag $F_{PWM}$ to zero in a step or module 1010 to disable the PWM mode of operation and transitions to a light current mode of operation. Otherwise, the controller continues in the PWM mode of operation and iteratively performs step 1005 until the auxiliary power switch current $I_{auxsw}$ exceeds the current threshold level $I_{thresh}$ or the controller changes the mode of operation based on another process therein.

Accordingly, the controller can advantageously transition to the light current mode of operation when DCM is reached. A controlled current level (e.g., a remnant current level) in the main power switch that is typically a small level of current is controlled in an interval of time that begins substantially when the auxiliary power switch is enabled to conduct and ends substantially when the main power switch is enabled to conduct (i.e., during the complementary duty cycle 1-D). The controller controls the remnant current level employing a current mirror in response to an output characteristic of the power converter. The controller may reduce the remnant current level in response to an increase of a sensed current of the power converter, such as a sensed output current.

In the light current mode of operation, the controller compares an output characteristic (e.g., an output voltage $V_{out}$) of the power converter to a lower output characteristic threshold level (e.g., a lower output voltage threshold level $V_{lower}$) in a step or module 1015. If the output voltage $V_{out}$ is less than the lower output voltage threshold level $V_{lower}$, the controller resets a switching cycle counter, for example, to zero in a step or module 1020, and transitions to a recharge mode of operation. Otherwise, the controller continues in the light current mode of operation and iteratively performs step 1015 until the output voltage $V_{out}$ exceeds the lower output voltage threshold level $V_{lower}$ or the controller changes the mode of operation based on another process therein.

In the recharge mode of operation, the main and auxiliary power switches are alternately enabled to conduct, and conduction in the main power switch is reduced to a remnant current level when a level of current in the main power switch (or an output inductor) increases to an upper current threshold level, which may be a fixed or adjustable upper current threshold level. Conduction in the auxiliary power switch is terminated when a level of current in the auxiliary power switch is reduced to a lower current threshold level, which may be a fixed or adjustable lower current threshold level of substantially zero current. The remnant current level is controlled by the controller responsive to the output characteristic of the power converter. In the recharge mode of operation, the controller initiates conduction by the main power switch with the switching cycle clock.

In the recharge mode of operation during each switching cycle, the controller compares the count of a switching cycle counter to a predetermined count such as a maximum count (designated "count_max") in a step or module 1025. If the count exceeds the maximum count, the controller transitions to a hybrid mode of operation. Otherwise, the controller executes a switch logic in a step or module 1030 as described above with respect to FIG. 8. The controller then compares an output characteristic (e.g., an output voltage $V_{out}$) of the power converter to an upper output characteristic threshold level (e.g., an upper output voltage threshold level $V_{upper}$) in a step or module 1035. If the output voltage $V_{out}$ is greater than the upper output voltage threshold level $V_{upper}$, the controller transitions to the light current mode of operation. Otherwise, the controller increments the switching cycle counter in a step or module 1040, continues in the recharge mode of operation and iteratively performs steps 1025, et seq., until the controller changes the mode of operation based thereon or another process therein.

In the hybrid mode of operation, the main and auxiliary power switches are alternately enabled to conduct in the substantially complementary portions of the switching cycle. The alternately enabled conduction is ordinarily controlled by an error amplifier coupled to the output characteristic of the power converter. In the hybrid mode of operation, conduction in the auxiliary power switch is terminated when a level of current in the auxiliary power switch is reduced to a lower current threshold level. Conduction in the auxiliary power switch is terminated to prevent a reverse current flowing through the output inductor of the power converter. A small reverse current flowing through the output inductor may be allowed to enable soft switching of the main power switch. A remnant current level in the main power switch is controlled in an interval of time that begins substantially when the auxiliary power switch is enabled to conduct and ends substantially when the main power switch is enabled to conduct (i.e., during a complementary duty cycle 1-D). The controller employs an error amplifier coupled to the output terminal of the power converter to control the remnant current level. In an exemplary case, when an output characteristic crosses a lower output characteristic threshold in the hybrid mode of operation, the switching cycle is terminated prior to the start time of the next switching cycle that is ordinarily controlled by the switching cycle clock. In another exemplary case, when a level of the output characteristic increases to an upper output characteristic threshold in the hybrid mode of operation, conduction in the main power switch can also be reduced to the remnant current level prior to a main power switch conduction termination time controlled by the error amplifier (i.e., during the primary duty cycle D).

In the hybrid mode of operation, the controller compares an output characteristic (e.g., an output voltage $V_{out}$) of the power converter to an upper output characteristic threshold level (e.g., an upper output voltage threshold level $V_{upper}$) in a step or module 1045. If the output voltage $V_{out}$ is greater than the upper output voltage threshold level $V_{upper}$, the flag $F_D$ is reset to zero and a conductivity of the main power switch is reduced to provide a controlled current level (e.g., a remnant current level) in a step or module 1050. Additionally, a flag $F_{1-D}$ is set to one to enable conduction of an auxiliary power switch in the step or module 1050. Thereafter, and if the output voltage $V_{out}$ is not greater than the upper output voltage threshold level $V_{upper}$, the controller compares an output characteristic (e.g., the output voltage $V_{out}$) of the power converter to a lower output characteristic threshold level (e.g., a lower output voltage threshold level $V_{lower}$) in a step or module 1055. If the output voltage $V_{out}$ is less than the lower output voltage threshold level $V_{lower}$, the controller terminates the switching cycle prior to the start time of the next switching cycle in a step or module 1060. Thereafter, or if the output voltage $V_{out}$ is not less than the lower output voltage threshold level $V_{lower}$, the controller compares a time (e.g., a duration of time operating in the hybrid mode of operation) to a predetermined or a maximum time (designated "timeout_max") in a step or module 1065. The maximum time may be computed by adding a time increment, such as 600 microseconds, to the time when the controller enters the hybrid mode of operation. If the time is greater than the maximum time, the controller sets a flag $F_{PWM}$ equal to one in a step or module 1070 to signal a transition to the PWM mode of operation in the next switching cycle. Otherwise, the controller continues in the hybrid mode of operation and iteratively performs step 1045, et seq. for the time window defined by the maximum time.

In an exemplary embodiment, adaptation of a duty cycle is made from time to time in, for instance, a PWM mode of operation to enable detection of a reverse or low level of current flow in an auxiliary power switch or output inductor. In conventional PWM operation, when the output voltage of the power converter is not significantly lower than the input voltage (which in a buck power converter generally produces a very short duty cycle for the auxiliary power switch), there may be insufficient time for current to flow in the auxiliary power switch for the controller to make an accurate determination of auxiliary power switch current. Accordingly, the controller may not make an accurate or reliable determination of the need to enter into the light current mode of operation. To provide a sufficient interval of time to enable the controller to measure the auxiliary power switch current, the controller from time to time limits a duty cycle of the auxiliary power switch, preferably for one switching cycle. For example, the controller may limit a duty cycle for one switching cycle for the auxiliary power switch periodically every sixty-four switching cycles and a corresponding increase a duty cycle for the main power switch during that switching cycle to preserve a switching frequency. The duty cycle of the auxiliary power switch is accordingly periodically limited, preferably for one switching cycle, after a number of switching cycles. Such infrequent modification of a duty cycle, which need not be periodic, produces a small deviation in an output characteristic such as an output voltage from a desired regulated value, which is generally not detrimental to the operation of the power converter.

Figure 11:
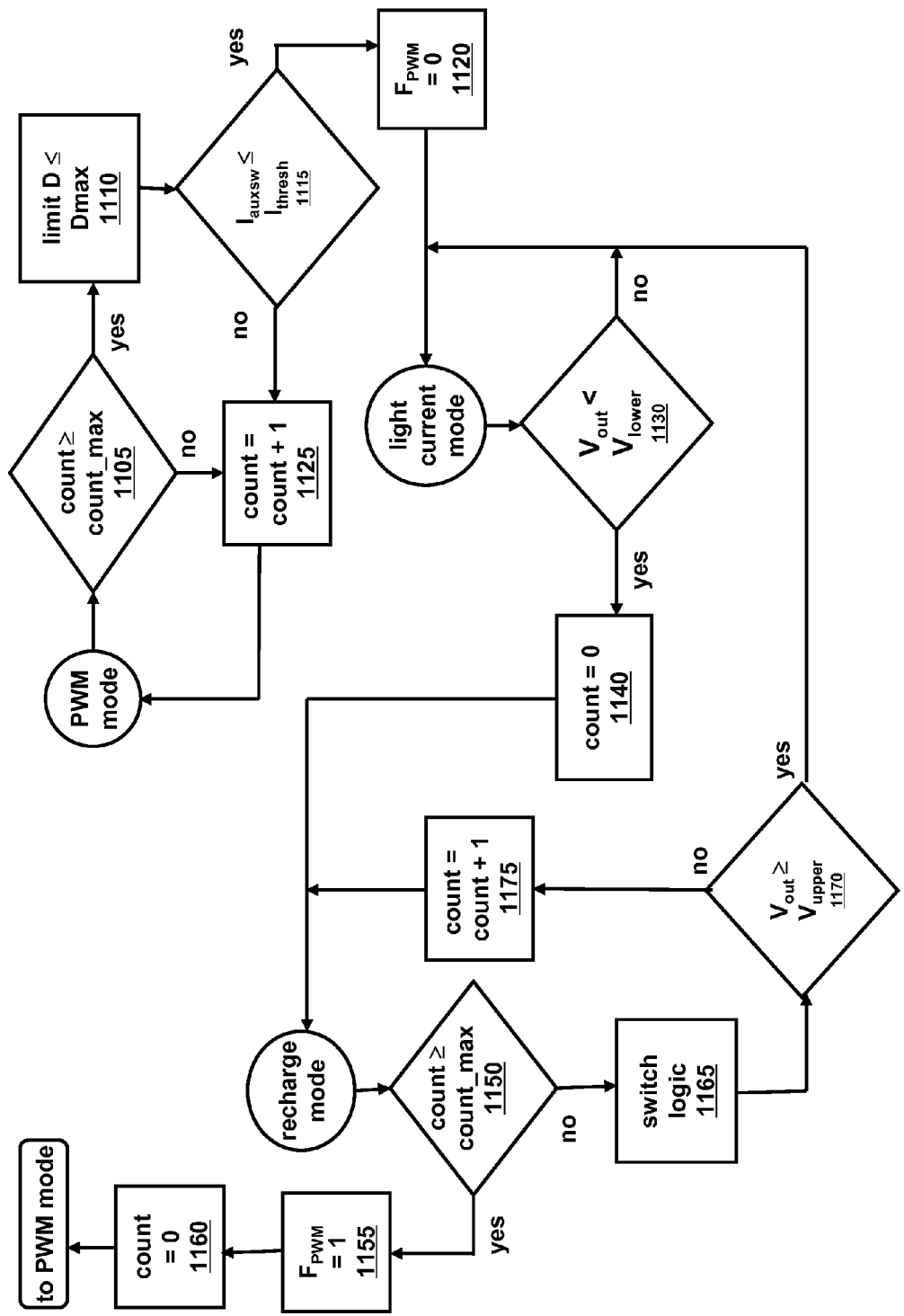

Turning now to FIG. 11, illustrated is a flow diagram of an embodiment of a method of operating a controller in accordance with the principles of the present invention. In addition to the exemplary order that follows, it should be understood that the method may begin at one of the described modes of operation. For instance, the controller may begin in a recharge mode of operation and follow the method of operation therefrom as provided below.

In the PWM mode of operation, the main and auxiliary power switches are alternately enabled to conduct in substantially complementary portions of a switching cycle in response to an output characteristic such as an output voltage of the power converter. A duty cycle is periodically limited for one switching cycle to facilitate detection of a reverse or low level of current flow in an auxiliary power switch or in an output inductor. If a switching cycle counter is greater than a predetermined count such as a maximum count (designated "count_max") as illustrated in a step or module 1105, then the duty cycle of a main power switch is increased (e.g., to a maximum value) and, correspondingly, the duty cycle of the auxiliary power switch is limited (e.g., to a minimum value) in a step or module 1110. For instance, the predetermined or maximum count may correspond to 64 switching cycles.

Thereafter, the controller samples a current, such as an auxiliary power switch current $I_{auxsw}$ (or an inductor current in an output inductor of a power converter), and compares the auxiliary power switch current $I_{auxsw}$ to a current threshold level $I_{thresh}$ in a step or module 1115. If the auxiliary power switch current $I_{auxsw}$ is less than the current threshold level $I_{thresh}$, the controller sets a flag $F_{PWM}$ to zero in a step or module 1120 to disable the PWM mode of operation and transitions to a light current mode of operation. Otherwise, or if the switching cycle counter is not greater than a maximum count in accordance with step or module 1105, the switching cycle counter ("count") is incremented as illustrated in a step or module 1125 and the controller continues in the PWM mode of operation and iteratively performs steps 1105, et seq. until the controller changes the mode of operation based thereon or another process therein. In this manner, a duty cycle is periodically limited for one switching cycle. Of course, the duty cycle limit need not be periodic, and the limit may be applied for more than one switching cycle to facilitate the current detection.

In the light current mode of operation, the controller compares an output characteristic (e.g., an output voltage $V_{out}$) of the power converter to a lower output characteristic threshold level (e.g., a lower output voltage threshold level $V_{lower}$) in a step or module 1130. If the output voltage $V_{out}$ is less than the lower output voltage threshold level $V_{lower}$, the controller resets a switching cycle counter, for example, to zero in a step or module 1140, and transitions to a recharge mode of operation. Otherwise, the controller continues in the light current mode of operation and iteratively performs step 1130 until the output voltage $V_{out}$ exceeds the lower output voltage threshold level $V_{lower}$ or the controller changes the mode of operation based on another process therein.

In the recharge mode of operation during each switching cycle, the controller compares the count of a switching cycle counter to a predetermined count such as a maximum count (designated "count_max") in a step or module 1150. If the count exceeds the maximum count, the controller sets a flag $F_{PWM}$ equal to one in a step or module 1155, resets a switching cycle counter, for example, to zero in a step or module 1160, and transitions to the PWM mode of operation. It should be noted that the maximum count that enables the transition from the recharge mode of operation to the PWM mode of operation may be different from the maximum count employed in the PWM mode of operation to limit a duty cycle of a power switch.

Otherwise, the controller executes a switch logic in a step or module 1165 as described above with respect to FIG. 8. The controller then compares an output characteristic (e.g., an output voltage $V_{out}$) of the power converter to an upper output characteristic threshold level (e.g., an upper output voltage threshold level $V_{upper}$) in a step or module 1170. If the output voltage $V_{out}$ is greater than the upper output voltage threshold level $V_{upper}$, the controller transitions to the light current mode of operation. Otherwise, the controller increments the switching cycle counter in a step or module 1175, continues in the recharge mode of operation and iteratively performs steps 1150, et seq., until the controller changes the mode of operation based thereon or another process therein.

Figure 12:
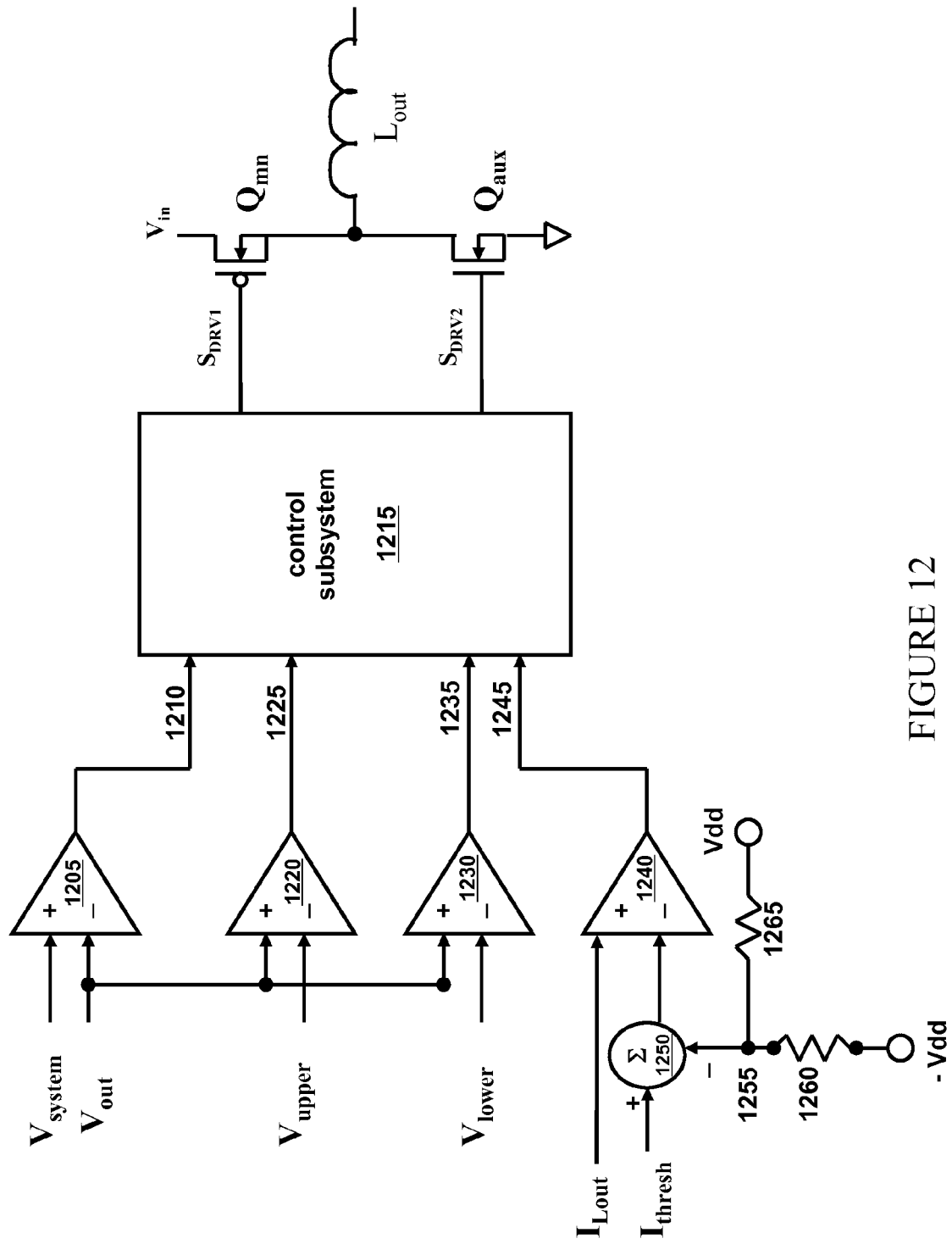
FIGS. 12 to 14 illustrate schematic drawings of embodiments of portions of power converters constructed according to the principles of the present invention.

Turning now to FIG. 12, illustrated is a schematic drawing of an embodiment of portions of a power converter constructed according to the principles of the present invention. The power converter includes a controller having an error amplifier 1205 that compares a desired system voltage $V_{system}$ with an output voltage $V_{out}$ of the power converter. A more complete schematic drawing of an error amplifier was illustrated and described above with respect to FIG. 4. An error amplifier signal 1210 from the error amplifier 1205 is coupled to control subsystem 1215 that includes mode transition logic. A first comparator 1220 compares the output voltage $V_{out}$ of the power converter with an upper output voltage threshold level $V_{upper}$ to produce a first comparator signal 1225, which is coupled to the control subsystem 1210 to enable a mode transition from a recharge mode of operation to a light current mode of operation.

A second comparator 1230 compares the output voltage $V_{out}$ of the power converter with a lower output voltage threshold level $V_{lower}$ to produce a second comparator signal 1235, which is coupled to the controller subsystem 1215 to enable a mode transition from a light current mode of operation to a recharge mode of operation. A third comparator 1240 compares a sensed inductor current $I_{Lout}$ in an output inductor $L_{out}$ with a current threshold level $I_{thresh}$ to produce a third comparator signal 1245, which is coupled to the controller subsystem 1215 to enable a mode transition from a PWM mode of operation to a light current mode of operation. In another embodiment, the third comparator 1240 may compare a sensed current in a power switch with the current threshold level $I_{thresh}$ to produce the third comparator signal 1245. In an analog circuit implementation, the threshold levels may be produced with a voltage reference and voltage dividers. In a digital circuit implementation, the threshold voltages may be recorded as stored data for use by digital logic to make the comparisons.

The controller also illustrates a summer 1250 that subtracts a signal at a circuit node 1255 representing a current level from the current threshold level $I_{thresh}$. As illustrated in FIG. 12, this signal representing the current level is produced by a resistor divider network formed with resistors 1260, 1265 that proportionately divide a voltage difference produced by a positive bias voltage source Vdd and a negative bias voltage source –Vdd. Accordingly, the signal at the circuit node 1255 representing the current level can be produced with positive or negative values according to the ratio of the resistance of the resistors 1260, 1265. The effect of subtraction of this signal at the circuit node 1255 representing the current level from the current threshold level $I_{thresh}$ enables adjustment of a current level at which conductivity of an auxiliary power switch $Q_{aux}$ is disabled (i.e., field adjustable to meet an application). The resistor 1260 may be provided as an external resistor coupled to external terminals to enable end users to perform this adjustment on their circuit boards without the need to modify the controller. Inclusion of an external resistor to perform this adjustment may be employed, without limitation, with any of the embodiments described hereinabove to control a mode transition from, for instance, a PWM mode of operation to a light current mode of operation. In accordance with the foregoing, the controller provides gate drive signals $S_{DRV1}$, $S_{DRV2}$ to control conductivity of the main and auxiliary power switches $Q_{mn}$, $Q_{aux}$, respectively, of the power converter.

Figure 13:
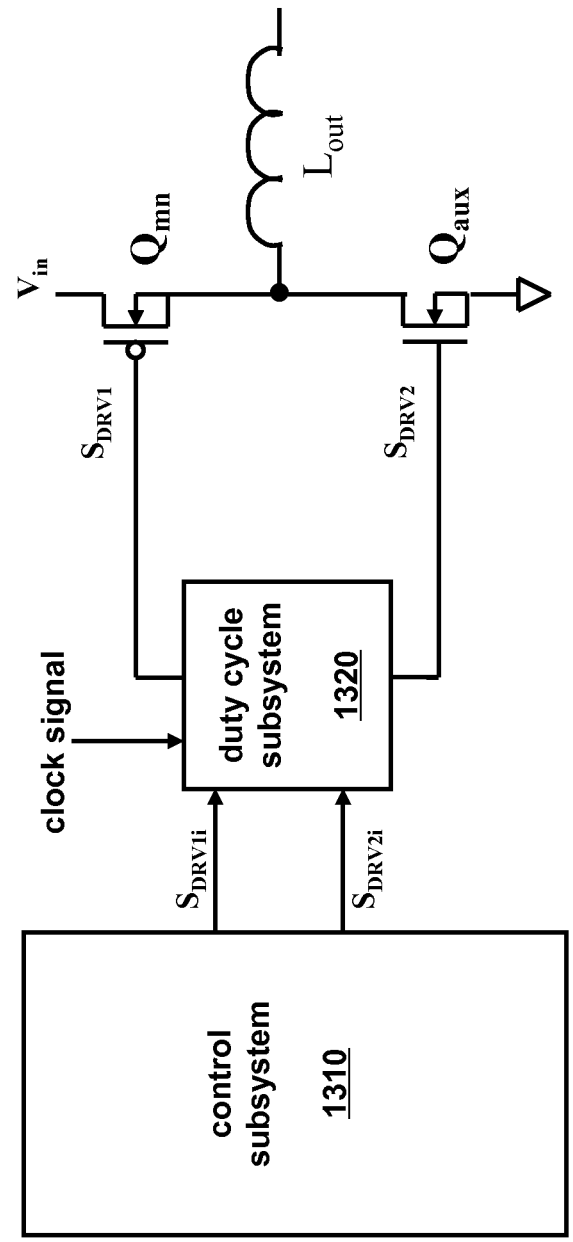

Turning now to FIG. 13, illustrated is a schematic drawing of an embodiment of portions of a power converter constructed according to the principles of the present invention. The power converter includes a controller that may periodically limit a duty cycle of a power switch in the power converter to facilitate detecting an auxiliary power switch current in an auxiliary power switch $Q_{aux}$. A control subsystem 1310 including mode transition logic produces initial gate drive signals $S_{DRV1i}$, $S_{DRV2i}$ to control conductivity of the main and auxiliary power switches $Q_{mn}$, $Q_{aux}$ respectively, of the power converter. The controller also includes a duty cycle subsystem 1320 that produces gate drive signals $S_{DRV1}$, $S_{DRV2}$ from the initial gate drive signals $S_{DRV1i}$, $S_{DRV2i}$ and a switching cycle clock signal (e.g., divide by 64) to periodically set or limit a duty cycle of at least one of the main and auxiliary power switches $Q_{mn}$, $Q_{aux}$. The duty cycle subsystem 1320 may be formed from comparator logic akin to the controller illustrated and described with respect to FIG. 12. In accordance with the switching cycle clock signal, the duty cycle subsystem 1320 counts a number of switching cycles after which it limits a duty cycle of a power switch such as a one-cycle power switch duty cycle limit.

Figure 14:
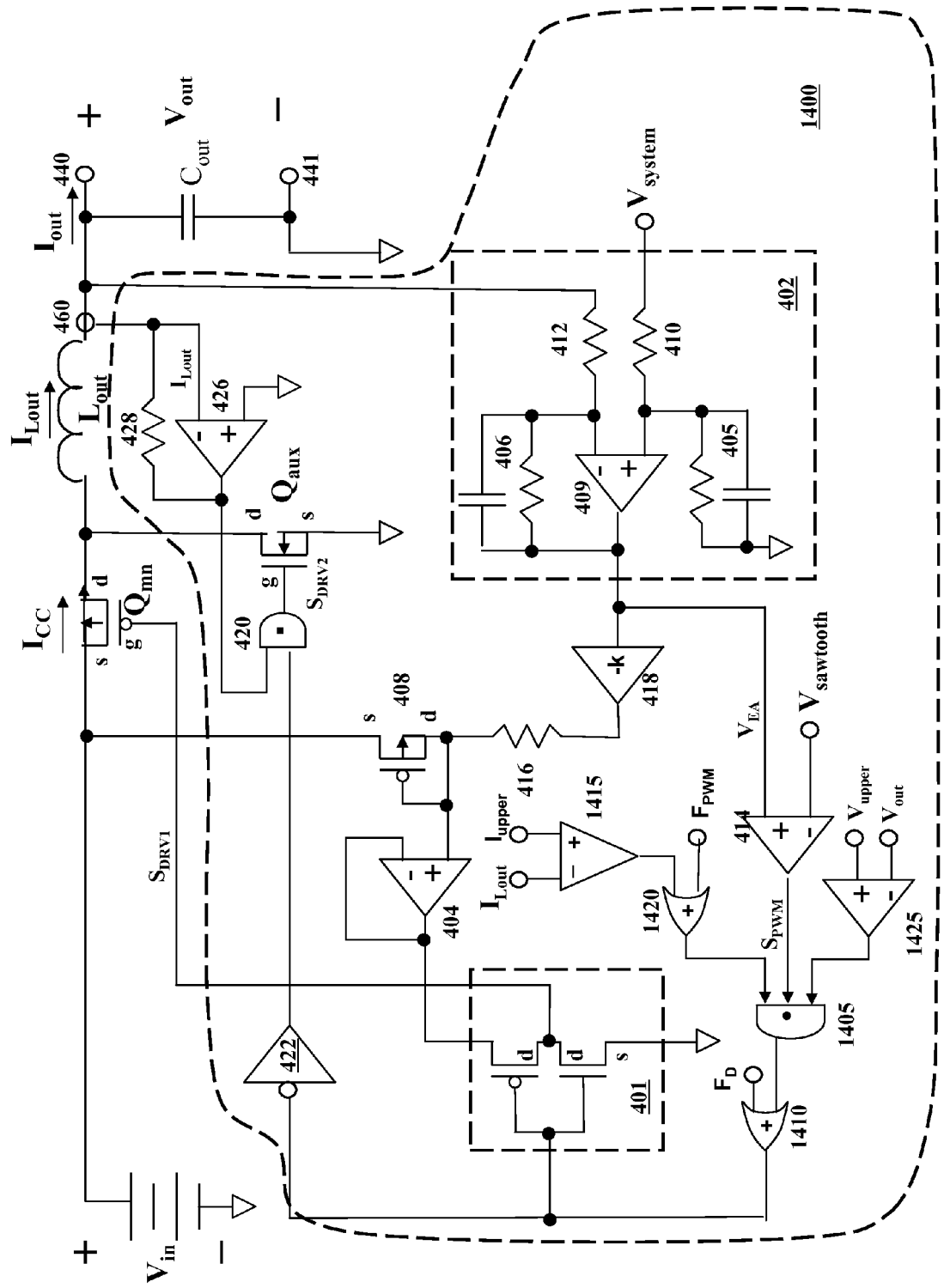

Turning now to FIG. 14, illustrated is a schematic diagram of an embodiment of portions of a power converter constructed according to the principles of the present invention. The power converter includes a controller 1400 that regulates an output characteristic (e.g., an output voltage $V_{out}$) of the power converter, and is configured to control current through a main power switch $Q_{mn}$ in response to a sensed or estimated current of the power converter. The controller 1400 of the power converter is operable in a plurality of modes of operation as described above. The logical processes to perform the modes of operation and transitions therebetween may be formed with digital circuit elements in accordance with a switching cycle clock to set flags to control circuit elements illustrated in FIG. 14. The controller 1400 is formed with elements illustrated and described hereinabove with reference to FIG. 4 that will not be redescribed in the interest of brevity.

Again, in addition to the elements described with respect to FIG. 4, the controller 1400 includes an AND gate 1405 that produces a signal to enable conductivity of main and auxiliary power switches $Q_{mn}$, $Q_{aux}$. If a flag $F_{PWM}$ is set to one (meaning that the controller is in a PWM mode of operation), then the AND gate 1405 produces a signal that is coupled to the input of an OR gate 1410 that enables a pulse-width modulated signal $S_{PWM}$ to control alternating conductivity of the main and auxiliary power switches $Q_{mn}$, $Q_{aux}$ in response to an error amplifier signal $V_{EA}$ produced by an operational amplifier 409. If the flag $F_{PWM}$ is set to zero, for example, in a recharge mode of operation, then an inductor current $I_{Lout}$ sensed by a current sensor 460 exceeding an upper current threshold level $I_{upper}$ is detected by a comparator 1415, and the resulting signal is coupled through an OR gate 1420 to an input of the AND gate 1405 to disable the pulse-width modulated signal $S_{PWM}$. Accordingly, conductivity of the main power switch $Q_{mn}$ is reduced to a remnant current level as described above. Continuing in the recharge mode of operation, when the output voltage $V_{out}$ is lower than the upper output voltage threshold level $V_{upper}$ and the flag $F_{PWM}$ is set to zero, a flag $F_D$ produced by a switch logic (see, e.g., switch logic illustrated and described with respect to FIG. 8) controls the alternating conductivity of the main and auxiliary power switches $Q_{mn}$, $Q_{aux}$ in conjunction with a comparator 1425.

Thus, the controller is constructed to provide a PWM mode of operation for a power converter with the main and auxiliary power switches $Q_{mn}$, $Q_{aux}$ alternately enabled to conduct in substantially complementary portions of a switching cycle in response to an output characteristic of the power converter such as the output voltage $V_{out}$. The controller also provides a recharge mode of operation for the power converter wherein the main and auxiliary power switches $Q_{mn}$, $Q_{aux}$ are alternately enabled to conduct, and conduction in the main power switch $Q_{mn}$ is terminated when a level of current, for example, a main power switch current in the main power switch $Q_{mn}$ or the inductor current $I_{Lout}$ in the output inductor $L_{out}$ increases to the upper current threshold level $I_{upper}$. The current sensor 460 mat sense a level of current in the output inductor $L_{out}$, the main power switch $Q_{mn}$ or the auxiliary power switch $Q_{aux}$ depending on which switch is enabled to conduct. Conduction in the auxiliary power switch $Q_{aux}$ is terminated when an auxiliary power switch current in the auxiliary power switch $Q_{aux}$ is reduced to a lower current threshold level. The controller controls a remnant current level in the main power switch $Q_{mn}$ during the complementary duty cycle 1-D.

The controller also provides a hybrid mode of operation wherein the main and auxiliary power switches $Q_{mn}$, $Q_{aux}$ are alternately enabled to conduct in the substantially complementary portions of the switching cycle controlled by an error amplifier coupled to the output characteristic of the power converter. Conduction in the main power switch $Q_{mn}$ is reduced to a remnant current level prior to a main power switch conduction termination time controlled by the error amplifier when a level of the output characteristic (e.g., the output voltage $V_{out}$) increases to an upper output characteristic threshold level (e.g., the upper output voltage threshold level $V_{upper}$) in conjunction with the comparator. Conduction in the auxiliary power switch $Q_{aux}$ is terminated prior to the control by the error amplifier when the auxiliary power switch current in the auxiliary power switch $Q_{aux}$ is reduced to a lower current threshold level. The switching cycle is terminated prior to the end time controlled by the switching cycle clock when the output characteristic such as the output voltage $V_{out}$ crosses a lower output characteristic threshold level, and a remnant current level in the main power switch $Q_{mn}$ is controlled in an interval of time that begins substantially when the auxiliary power switch $Q_{aux}$ is enabled to conduct, and ends substantially when the main power switch $Q_{mn}$ is enabled to conduct (i.e., during the complementary duty cycle). A duty cycle of the auxiliary power switch $Q_{aux}$ is periodically limited for at least one of the switching cycles after a number of switching cycles.

Figure 15:
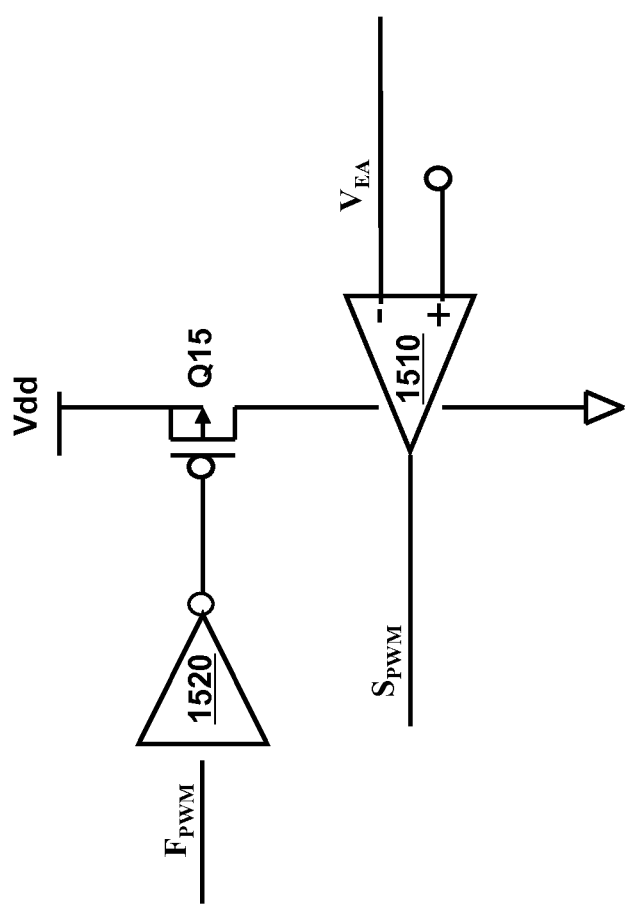
FIGS. 15 and 16 illustrate schematic drawings of embodiments of portions of controllers constructed according to the principles of the present invention.

Turning now to FIG. 15, illustrated is a schematic drawing of an embodiment of portions of a controller constructed according to the principles of the present invention. The controller includes comparator 1510 (see, e.g., comparator 414 illustrated and described with respect to FIG. 4). A switch formed as a P-channel MOSFET Q15 is coupled in series with a positive bias node of the comparator 1510 and the positive bias voltage source Vdd. When a flag $F_{PWM}$ exhibits a positive voltage (i.e., when the value of the flag $F_{PWM}$ is one to indicate that the power converter is operating in a PWM mode of operation), an inverter 1520 applies a substantially zero voltage to the gate of the P-channel MOSFET Q15, thereby turning on the same. When the flag $F_{PWM}$ exhibits substantially zero voltage (i.e., when the value of the flag $F_{PWM}$ is zero), the inverse situation occurs (i.e., the positive bias voltage source Vdd is decoupled from the comparator 1510), thereby disabling operation of the comparator 1510. The flag $F_{PWM}$ is equal to zero in the light current mode of operation. In this manner, switching and other inherent losses in the comparator 1510 can be avoided when the power converter is operating in the light current mode of operation. Of course, other logic may be included in the design of the controller to enable or disable operation of the comparator 1510 in another mode of operation such as a recharge mode of operation.

In applications of a power converter for which an end user desires to improve power converter efficiency when the power converter delivers a light current to a load, it is advantageous to adjust a current threshold level at which the power converter transitions from a PWM mode of operation to a light current mode of operation. In the light current mode of operation, the alternately enabled conductivity of the main and auxiliary power switches is disabled when current flowing in a power switch such as the auxiliary power switch or in the output inductor falls below the current threshold level. In the PWM mode of operation, the magnitude of the peak-to-peak ripple current $I_{pk\_pk}$ produced in the output inductor is dependent on the input voltage $V_{in}$ and the output voltage $V_{out}$ of the power converter. Accordingly, the input voltage $V_{in}$, and the output voltage $V_{out}$ determine a direct current level of an output current $I_{outdc}$ from the power converter at which the power converter transitions from the PWM mode of operation to the light current mode of operation.

The value of the magnitude of the peak-to-peak ripple current $I_{pk\_pk}$ can be calculated for a buck power converter according to equation (3):

$$I_{pk\_pk} = \frac{V_{in} - V_{out}}{L_{out}} \cdot t_{ON} = \frac{V_{out}}{L_{out}} \cdot t_{OFF}, \quad (3)$$

where $t_{ON}$ is the on-time of the main power switch (i.e., $t_{ON} = D \cdot \Delta T_s$), $t_{OFF}$ is the complement of the on-time of the main power switch with respect to the period $\Delta T_s$ of a switching cycle (i.e., $t_{OFF} = (1-D) \cdot \Delta T_s$) and $L_{out}$ in equation (1) is the inductance of the output inductor. The parameter $\Delta T_s$ is the period of a switching cycle as illustrated in FIGS. 9A and 9B. During the on-time $t_{ON}$ of the main power switch, the current in the output inductor has a positive slope, and during the on time of the auxiliary power switch, the current in the output inductor has a negative slope. Accordingly, at the end of the on time of the auxiliary power switch, the auxiliary power switch current and the inductor current in the output inductor reaches a minimum value.

The minimum value $I_{minLout}$ of the instantaneous current in the output inductor or the auxiliary power switch can be calculated from the direct current level of an output current $I_{outdc}$ and the on-time $t_{ON}$ according to equation (4):

$$I_{minLout} = I_{outdc} - \frac{V_{in} - V_{out}}{2 \cdot L_{out}} \cdot t_{ON}. \quad (4)$$

If the end user desires the power converter to transition from the PWM mode of operation to the light current mode of operation at a particular direct current level of an output current $I_{outdc}$ of the power converter, then the current threshold level $I_{thresh}$ illustrated in FIG. 12 is adjusted (with an offset as desired produced by the signal at the circuit node 1255) to the minimum value $I_{minLout}$ corresponding to the direct current level of an output current $I_{outdc}$ and the on-time $t_{ON}$ as indicated above by equation (2).

Figure 16:
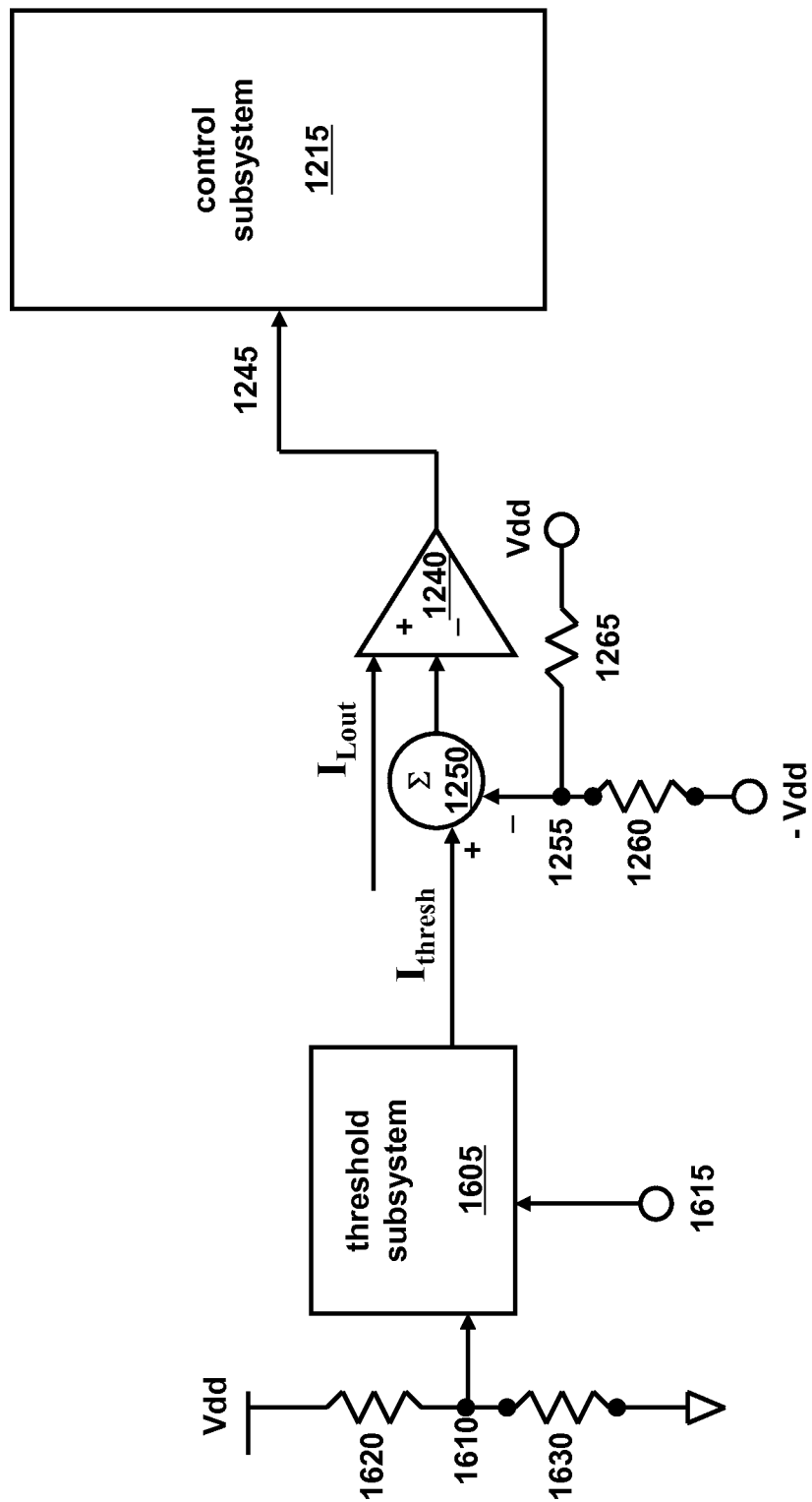

Turning now to FIG. 16, illustrated is a schematic drawing of an embodiment of portions of a controller constructed according to the principles of the present invention. The controller is formed with some of the elements illustrated and described hereinabove with reference to FIG. 12 that will not be redescribed in the interest of brevity. The controller is configured to adjust a current threshold level $I_{thresh}$ in accordance with the direct current level of an output current from the power converter at which the controller transitions from the PWM mode of operation to the light current mode of operation. A threshold subsystem 1605 produces a current threshold level $I_{thresh}$ that the controller employs to set a flag $F_{PWM}$ to zero (see, e.g., step or module 710 in FIG. 7) to disable a PWM mode of operation and to transition to the light current mode of operation. The threshold subsystem 1605 generates or computes the current threshold level $I_{thresh}$ according to equation (4) from a signal at a circuit node 1610 that represents the direct current level an output current from the power converter at which the controller transitions from the PWM mode of operation to the light current mode of operation.

The controller also employs a signal 1615 that represents the duty cycle D of the main power switch $Q_{mn}$ that determines the on-time $t_{ON}$. The controller internally computes the duty cycle D in determination of the pulse-width modulated signal $S_{PWM}$ illustrated in FIGS. 4 and 14 and, can thus, readily access the on-time $t_{ON}$. The direct current level of an output current is set by the resistor divider network formed with resistors 1620, 1630 coupled between the positive bias voltage source Vdd and circuit ground. The resistor 1630 may be an external resistor coupled between external nodes to enable an end user to set (or adjust) the desired direct current level of the output current. Thus, the direct current level of the output current and the on-time input are provided to the threshold subsystem 1605 to enable computation of the current threshold level $I_{thresh}$ to control the direct current level of the output current at which the controller transitions from the PWM mode of operation to the light current mode of operation.

Thus, as illustrated and described with reference to the accompanying drawings, a controller for a circuit such as a switch-mode power converter operable in a plurality of modes is constructed in an advantageous embodiment. The controller may advantageously be formed with an error amplifier that is coupled to power converter elements to disable power switch conductivity upon, for instance, reversal or reduction of a power converter current, and to provide a controlled current level in a main power switch. It is contemplated within the broad scope of the invention that a mode of operation can be changed based upon a power converter current, sensed or estimated, falling below a threshold level. It is further contemplated that a controller can be constructed with a plurality of error amplifiers to control an output characteristic in a plurality of modes of operation. It is further contemplated that the controller can be constructed to operate in a plurality of modes of operation based on sensing or estimating a parameter that may be an indirect indicator of an output characteristic such as an output current.

Those skilled in the art should understand that the previously described embodiments of a power converter and related methods of constructing the same are submitted for illustrative purposes only. In addition, other embodiments capable of producing a power converter employable with other switch-mode power converter topologies are well within the broad scope of the present invention. While the power converter has been described in the environment of a power converter including a controller to control an output characteristic to power a load, the power converter including a controller may also be applied to other systems such as a power amplifier, a motor controller, and a system to control an actuator in accordance with a stepper motor or other electromechanical device.

For a better understanding of power converters, see "Modern DC-to-DC Switchmode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controller for use with a circuit having first and second switches operable in a mode of operation, configured to:
   alternately enable conduction of said first and second switches with primary and complementary duty cycles, respectively, in response to an output characteristic of said circuit during a switching cycle, said first switch configured to couple an output inductor to an input of said circuit and said second switch configured to couple said output inductor across output terminals of said circuit; and
   disable conduction of said second switch when a current associated with said second switch is less than a current threshold level, said current threshold level being a fixed level selected to prevent reverse current flow in an inductor current through said output inductor and adjusted with a resistor divider network coupled to a positive bias voltage source and a negative bias voltage source, said current associated with said second switch being one of a second switch current and said inductor current through said output inductor of said circuit.

2. The controller as recited in claim 1 wherein said resistor divider network is configured to divide a voltage difference between said positive bias voltage source and said negative bias voltage source.

3. The controller as recited in claim 1 wherein said resistor divider network includes an external resistor.

4. The controller as recited in claim 1 wherein said current associated with said second switch is an instantaneous current.

5. The controller as recited in claim 1 wherein said controller is configured to control a level of current of said first switch during said complementary duty cycle.

6. The controller as recited in claim 1 wherein said circuit is operable in another mode of operation when said current associated with said second switch is less than said current threshold level and said controller is configured to alternately enable conduction of said first and second switches with primary and complementary duty cycles, respectively, in response to said output characteristic of said circuit during said switching cycle and control a level of current of said first switch when said alternately enabling conduction of said first and second switched is disabled.

7. The controller as recited in claim 6 wherein said controller is configured to disable elements therein during said another mode of operation.

8. The controller as recited in claim 1 wherein said controller is configured to limit said complementary duty cycle when a switching cycle counter exceeds a predetermined count.

9. The controller as recited in claim 1 wherein said output characteristic is an output voltage of said circuit.

10. A method for use with a circuit having first and second switches operable in a mode of operation, comprising:
    alternately enabling conduction of said first and second switches with primary and complementary duty cycles, respectively, in response to an output characteristic of said circuit during a switching cycle, said first switch configured to couple an output inductor to an input of said circuit and said second switch configured to couple said output inductor across output terminals of said circuit; and
    disabling conduction of said second switch when a current associated with said second switch is less than a current threshold level, said current threshold level being a fixed level selected to prevent reverse current flow in an inductor current through said output inductor and adjusted with a resistor divider network coupled to a positive bias voltage source and a negative bias voltage source, said current associated with said second switch being one of a second switch current and said inductor current through said output inductor of said circuit.

11. The method as recited in claim 10 wherein said resistor divider network divides a voltage difference between said positive bias voltage source and said negative bias voltage source.

12. The method as recited in claim 10 wherein said resistor divider network includes an external resistor.

13. The method as recited in claim 10 wherein said current associated with said second switch is an instantaneous current.

14. The method as recited in claim 10 further comprising controlling a level of current of said first switch during said complementary duty cycle.

15. The method as recited in claim 10 wherein said circuit is operable in another mode of operation when said current associated with said second switch is less than said current threshold level, said method further comprising alternately enabling conduction of said first and second switches with primary and complementary duty cycles, respectively, in response to said output characteristic of said circuit during said switching cycle and controlling a level of current of said first switch when said alternately enabling conduction of said first and second switched is disabled.

16. The method as recited in claim 15 further comprising disabling elements during said another mode of operation.

17. The method as recited in claim 10 further comprising limiting said complementary duty cycle when a switching cycle counter exceeds a predetermined count.

18. The method as recited in claim 10 wherein said output characteristic is an output voltage of said circuit.

* * * * *